United States Patent [19]
VanDenberg

[11] Patent Number: 5,199,738
[45] Date of Patent: Apr. 6, 1993

[54] LANDING GEAR FOR SEMITRAILERS

[75] Inventor: Ervin VanDenberg, North Canton, Ohio

[73] Assignee: Jost International of Grand Haven Michigan, Grand Haven, Mich.

[21] Appl. No.: 685,836

[22] Filed: Apr. 16, 1991

[51] Int. Cl.$^5$ .............................................. B60S 9/06
[52] U.S. Cl. .................................. 280/766.1; 74/344; 74/345; 192/67 R; 248/188.4; 248/352; 248/650
[58] Field of Search ................... 280/766.1, 763.1, 43, 280/43.22, 43.13; 248/352, 188.4, 650; 74/343, 342, 344, 345, 665 F, 665 GA, 665 G; 192/67 R

[56] References Cited

U.S. PATENT DOCUMENTS

| 1,686,989 | 10/1928 | Ridley | 192/67 R |
|---|---|---|---|
| 2,885,220 | 5/1959 | Dalton | 280/766.1 |
| 3,675,497 | 7/1972 | Thomas | 192/67 R |
| 3,892,141 | 7/1975 | Phillips, Jr. et al. | 74/342 |
| 4,482,039 | 11/1984 | Harris | 192/67 R |

FOREIGN PATENT DOCUMENTS

| 6007 | 12/1979 | European Pat. Off. | 280/766.1 |
|---|---|---|---|
| 0398705 | 5/1990 | European Pat. Off. | |

OTHER PUBLICATIONS

A sales brochure entitled "Contender TM", from Binkley, Transportation Products Division, Warrenton, MO 63383.

A sales brochure entitled "Fruehauf Supports" available from Fruehauf Corporation, Detroit, MI.

A sales brochure entitled "Kwik Shift TM Round and Square Leg Trailer Supports," Models CMR and CMS available from Kysor/Westran, P.O. Box 921, Byron, IL 61010-0921.

A sales brochure entitled "Mark V Landing Gears and Accessories," available from Holland Hitch Company, Holland, MI.

A parts drawing of unknown origin, labelled "Exhibit U", showing a landing gear assembly.

Primary Examiner—Eric D. Culbreth
Attorney, Agent, or Firm—Hudak & Shunk Co.

[57] ABSTRACT

A landing gear for semitrailers includes a two speed double reduction gear assembly having fewer, smaller, and simpler parts, resulting in a compact double reduction gear assembly and cost efficient landing gear unit with a unique clutch-shifting mechanism to provide for shifting from one ratio to another. The double reduction gear assembly is disposed on and about in-line input and output shafts further resulting in an easy to crank and shift landing gear unit capable of achieving standard crank handle turn to vertical leg travel distance ratios. The low gear or low speed ratio of the landing gear unit can be varied within a broad range during manufacture, if desired, generally without increasing the overall size or complexity of the two speed double reduction gear assembly. The landing gear can further include a universal mounting feature and is durable and simple to use.

20 Claims, 16 Drawing Sheets

LANDING GEAR FOR SEMITRAILERS

FIELD OF THE INVENTION

The invention relates to landing gear for semitrailers, and in particular to a landing gear having a double reduction gear assembly. More particularly, the invention relates to such a landing gear which achieves standard crank handle turn to vertical travel distance ratios with a two-speed double reduction gear assembly, which utilizes fewer, simpler and smaller parts to achieve such standard ratios resulting in a relatively compact, cost-effective double reduction gear assembly, featuring a unique shift-clutching mechanism which reduces the number of parts and reduces cost while making it easier to shift between high and low speeds.

BACKGROUND ART

Landing gear for semitrailers have heretofore been and will presumably continue to be a high volume product, with estimated sales in the United States normally exceeding 300,000 sets per year generating income of more than 50 million dollars. The high demand for landing gear is directly related to the use of semitrailers pulled by truck tractors as a primary means of shipping goods in the United States. A conventional two-speed landing gear consists of a pair of gear-driven laterally spaced telescopic legs which are mounted on and depend from a front end of the semitrailer which engages the truck tractor.

Landing gear, and particularly two-speed landing gear are used in association with semitrailers in the following manner. A typical scenario begins with the operator of a truck tractor dropping off the semitrailer at a location such as a dock for loading or unloading of the semitrailer. This semitrailer is retrieved when loading or unloading is completed, often by another tractor. When disconnecting after positioning the semitrailer in the desired location, the truck operator manually turns a crank handle to extend the legs until the legs engage the ground. The operator typically uses the high gear or high speed of the two-speed gear assembly to quickly extend the landing gear legs from the retracted position to the extended position where the legs contact the ground. It should be noted that when the landing gear assembly is engaged in high gear, quick traversal of a vertical distance can be accomplished due to the low ratio of crank handle turns to inches of vertical leg travel distance afforded by the high gear, which ratio usually is from about 2 to about 5 depending on the unit being utilized. However, the tradeoff for such a low ratio achieved in high gear is a lower mechanical advantage than that which can be achieved in a low gear. In practical terms, this means that the truck operator cannot raise or lower a load in high gear. In low gear the ratio of crank handle turns to distance traveled is higher, usually from about 15 to about 50, but a higher mechanical advantage is enjoyed. This enables the truck operator to raise or lower loads in low gear that could not be moved in high gear, albeit at a slower pace than if such loads could be moved in high gear. In order to pull the truck tractor away from the stationary semitrailer, the operator must disengage the depending kingpin of the semitrailer from the fifth wheel of the truck tractor by disengaging the fifth wheel jaws. Since the tractor is spring-biased in an upward direction, it is desirable to raise the semitrailer to relieve some of the load allowing the tractor to pull away from the semitrailer more easily. Therefore, the operator may shift the gear assembly to low gear in order to further extend the landing gear legs and raise all or part of the load of the semitrailer from the fifth wheel. After releasing the movable jaws of the fifth wheel, the tractor is disengaged from the semitrailer.

When an operator picks up a semitrailer which has been loaded or unloaded, he or she must back the truck tractor fifth wheel under the semitrailer and engage the kingpin. If the semitrailer was resting on a stable surface such as concrete, and a similar tractor is utilized, the necessary clearance to allow coupling most likely still exists between the ground and the kingpin, and the operator merely will back the truck tractor under the semitrailer engaging the kingpin. The operator will shift the landing gear into low gear to lower the load onto the tractor, then shift into high gear and quickly retract the legs to provide clearance for vehicle operation. More particularly, the legs are positioned approximately one foot off of the ground to provide clearance for over-the-road travel. However, if the semitrailer was left on a relatively unstable surface such as soft ground or blacktop, the semitrailer legs sometimes sink into the ground under the load of the trailer between the drop off and pickup times. If this is the case, or if a higher tractor is employed, prior to backing the truck tractor under the semitrailer the operator must further extend the legs to raise the trailer to provide sufficient clearance between the ground and the kingpin. This requires the operator to shift the landing gear into low gear to gain mechanical advantage to raise the trailer. After coupling to the tractor and lowering the trailer load onto the tractor using low gear, the operator then will proceed as described above to retract the legs in high gear to position the legs for over-the-road travel.

As expected, in view of the potential income accruing from possible sales of landing gear units, manufacturers of the landing gear are continually attempting to improve their products to present a more economical landing gear having improved performance features, in order to gain a larger share of the landing gear market.

SUMMARY OF THE INVENTION

Objects of the present invention include providing a landing gear for semitrailers having a two-speed double reduction gear assembly, in which the gear assembly is comprised of fewer, smaller and simpler parts thereby making it easier to manufacture and assemble and further resulting in an assembly which is compact and can be contained in a smaller gear box, wherein all of the above factors contribute to a lower overall cost of the landing gear unit.

Another object of the invention is to provide such a landing gear which is easier to crank and shift, and which can be universally mounted.

A further object of the invention is to provide such a landing gear capable of achieving commercially standard crank handle turn to vertical leg travel distance ratios, wherein the low speed ratio could be fixed within a broad range during manufacture, if desired, generally without increasing the overall size or complexity of the two speed double reduction gear assembly.

A still further object of the invention is to provide a landing gear which is durable and simple to use.

These objects are obtained by the two speed landing gear assembly for a semitrailer of the present invention, comprising, first and second upright telescopic legs mounted in a laterally spaced relationship generally adjacent to a front end of the semitrailer, in-line laterally-oriented input and output shafts rotatably mounted on the first leg, the output shaft being operatively connected to an input shaft rotatably mounted on the second leg, and gear means mounted on and generally adjacent to each of the shafts for operating the landing gear in a high gear or high speed and a low gear or low speed, so that upon shifting the gear means of the first leg input and output shafts into low gear, the ratio of turns of the first leg input shaft to inches of vertical travel of the legs of from about 15 to about 50 is achieved, and upon shifting the first leg gear means into high gear, the ratio of from about 2 to about 5 is achieved.

BRIEF DESCRIPTION OF THE DRAWINGS

Similar numerals refer to similar parts throughout the drawings.

DETAILED DESCRIPTION OF THE INVENTION

Figure 1:
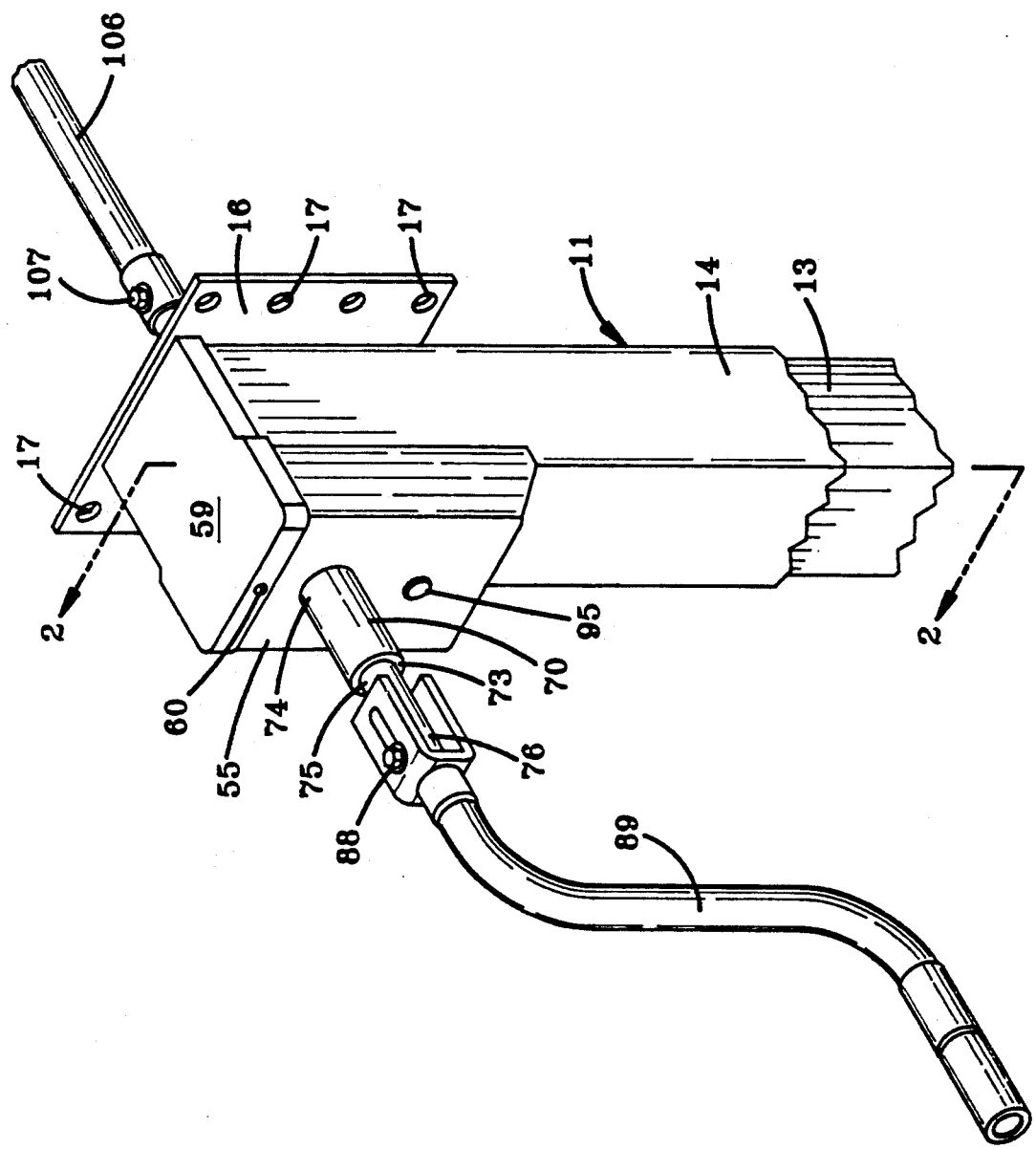
FIG. 1 is a fragmentary perspective view of a first embodiment of the two speed double reduction gear assembly of the cranking leg of the landing gear of the present invention, shown adapted for mounting on an outboard position on a semitrailer frame.
Figure 5:
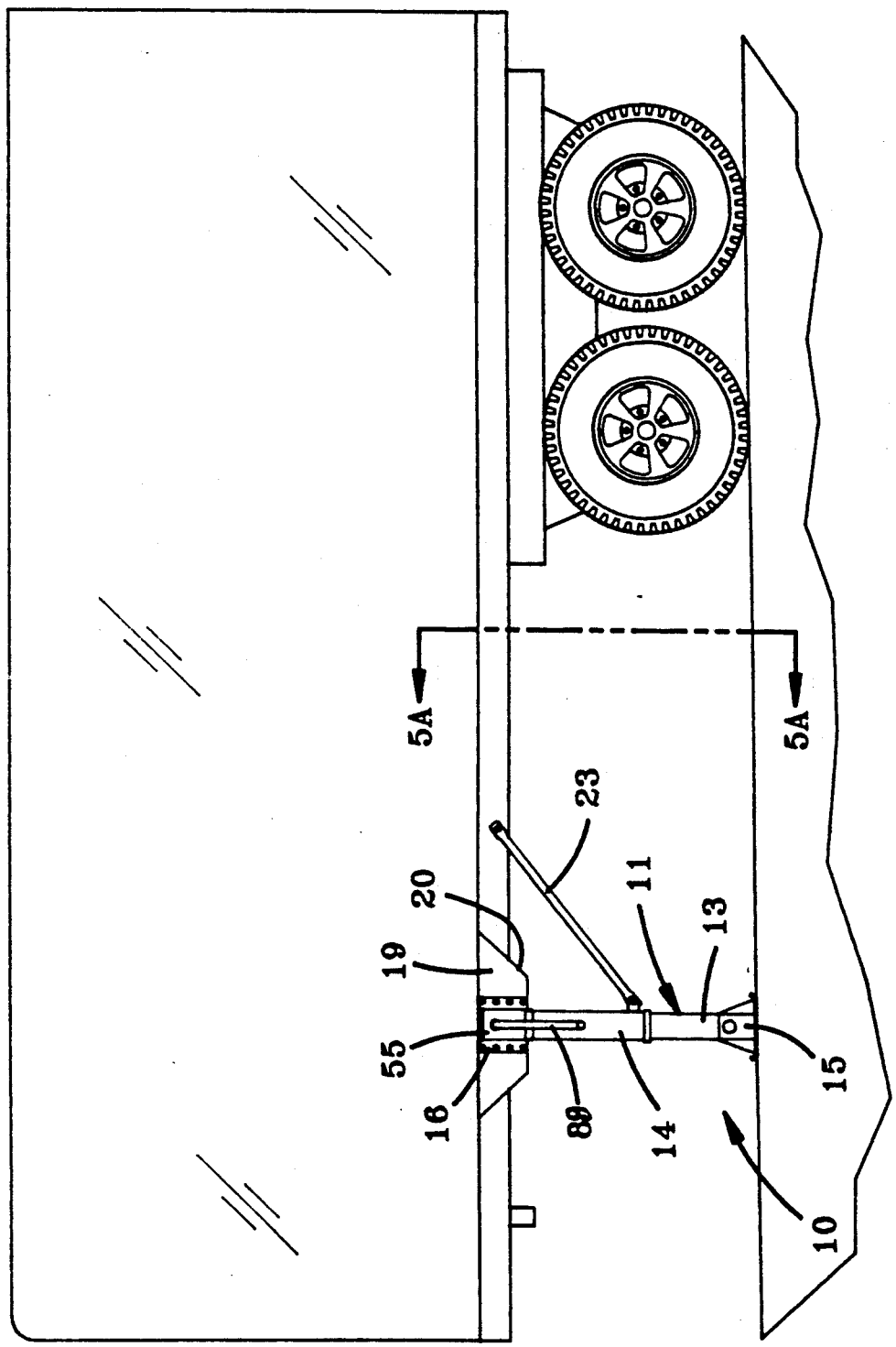
FIG. 5 is a side elevation view of a truck tractor and disengaged semitrailer having the landing gear of FIG. 1 mounted thereon, and supporting the front end of the semitrailer.
Figure 5A:
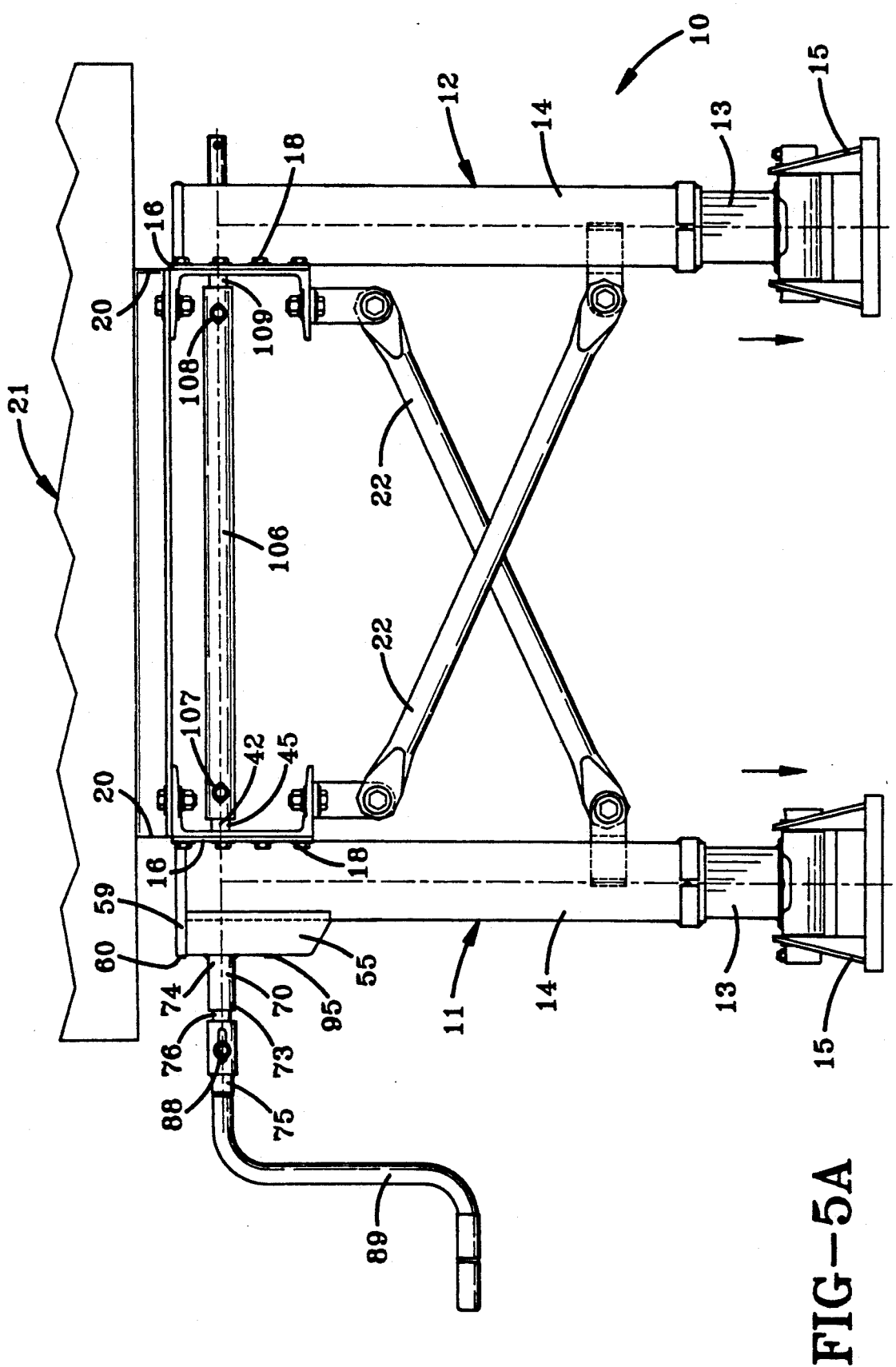
FIG. 5A is a view looking in the direction of arrows 5A of FIG. 5.

A first embodiment of the landing gear for semitrailers of the present invention, is shown in its intended use in FIGS. 5 and 5A and is indicated generally at 10. Landing gear 10 generally includes a pair of upright, spaced, parallel cranking and opposite-side legs 11 and 12, respectively. In the embodiment shown in FIGS. 5 and 5A, cranking leg 11 is disposed on the left or driver's side of the semitrailer and opposite-side leg 12 is positioned on the right or curb-side of the semitrailer. However, it is understood that cranking leg 11 could be placed on the curb-side of the semitrailer and opposite-side leg 12 could be placed on the driver's side without affecting the concept of the present invention. Hereafter, cranking side and opposite-side legs 11 and 12 will be referred to as the left or driver's side and right or curb-side legs, respectively. Each leg 11, 12 includes a lower tube 13 telescopically disposed (FIGS. 2 and 3) within an upper tube 14, in a manner well known to the art and to the literature. A foot 15 is connected to the lower end of lower leg tube 13 in a conventional manner. A flange plate 16 is attached to an upper inboard portion of upper leg tube 14 by any suitable means such as welding (FIG. 1). Each protruding end of flange plate 16 is formed with a plurality of openings 17 for receiving fastening means 18 such as bolts or the like, for attachment of legs 11, 12 to an outboard surface 19 of a frame 20 of a semitrailer 21 (FIGS. 5 and 5A).

A pair of crossing transverse brace bars 22 (FIG. 5A) each is attached at one of its ends to semitrailer frame 20 and at the other of its ends to an opposite leg 11, 12, respectively, for generally stabilizing the legs against side thrust forces and the like. A pair of longitudinal brace bars 23 (FIG. 5) each is attached at one of its ends to upper tube 14 of a respective one of legs 11, 12, and at the other of its ends to semitrailer frame 20.

With regard to the internal components of left or driver's side leg 11, a nut 25 is fixed on the upper end of lower leg tube 13 for threadably receiving a vertical elevating screw shaft 26 (FIGS. 2 and 4) which includes a threaded lower shaft 24 and a reduced diameter, integral unthreaded upper shaft 27. A shoulder 28 is formed at the interface of upper and lower shafts 27 and 24, respectively. An annular collar 29 bears on shoulder 28, and an annular thrust bearing 30 rests on collar 29 about upper shaft 27. A floor base 31 rests on bearing 30 and is disposed about upper shaft 27 which passes through a continuous opening 32 formed in the base. Floor base 31 is welded to the inside surfaces of upper leg tube 14. A hardened thrust washer 33 is disposed on upper shaft 27 and rests on the upper surface of floor base 31. A bevel gear 34 is slidably engaged on upper shaft 27, and is captured thereon in abutment with washer 33 by a beveled pinion gear 40. More specifically, the teeth of laterally oriented cooperative bevel pinion gear 40, which has a smaller diameter than bevel gear 34, mesh with the teeth of horizontally oriented bevel gear 34. Rotary motion is transmitted to upper shaft 27 by a pin 35 which couples bevel gear 34 to the upper shaft in a manner familiar to those of ordinary skill in the art. Hardened thrust washer 33 provides a wear surface for contact by bevel gear 34 and coupling pin 35. Thrust washer 33, bevel gear 34, pin 35, and pinion gear 40 all are contained in an upper compartment 41 of upper leg tube 14 located above floor base 31. Bevel pinion 40 is securely mounted on a laterally oriented output shaft 42 by a pin 43, in a usual manner. Output shaft 42 includes first and second ends 44 and 45 which pass through bushings 46 and 47, respectively, which in turn are fitted in aligned openings 48 and 49 formed in the outboard and inboard walls of upper tube 14 of leg 11. A spacer tube 50 maintains bushings 46, 47 and bevel pinion 40 in their intended positions to prevent lateral movement of output shaft 42.

In accordance with one of the main features of the present invention, a metal gear case 55 and the outboard wall of upper leg tube 14 generally define a gear case compartment 56 into which first end 44 of output shaft 42 extends (FIGS. 1, 2, 3 and 5A). Gear case 55, due to the small number, size and compact orientation of the components contained therein, is formed by a metal bending process as compared to many prior art gear boxes which must be formed by more expensive metal stamping processes due to the larger number, size and/or less compact orientation of the components contained therein. More specifically, the components of the two speed double reduction gear assembly of the landing gear of the present invention contained in gear case 55, all are generally adjacent to the outboard wall of upper leg tube 14, and in particular do not extend beyond the width of the outboard wall. Therefore, gear case 55 formed by mere bending, cooperates with the outboard wall of upper leg tube 14 to adequately cover the components contained therein. In contrast, many prior art landing gear assemblies extend beyond the width of the adjacent upper leg tube, thus requiring, in many cases, a two piece gear case which must be stamped or otherwise machined so that the two pieces fit together properly and adequately protect the components contained therein from outside elements. Gear case 55 is attached to the outboard wall of upper leg tube 14 by a bead weld 57 or the like. A gasket 58 formed of rubber or the like is positioned over the upper open ends of upper leg tube 14 and gear case 55, and is secured thereon and protected by cover 59 which in turn is secured in place by a plurality of screws 60 which threadably engage threaded openings 61 formed in gear case 55. Gasket 58 and cover 59, in cooperation with gear case 55, effectively protect the two speed double reduction gear assembly of landing gear 10 contained within upper compartment 41 of upper leg tube 14 and gear case compartment 56 of leg 11, from outside elements such as dirt, moisture, etc., which could interfere with the efficient operation of the gear assembly.

Figure 2:
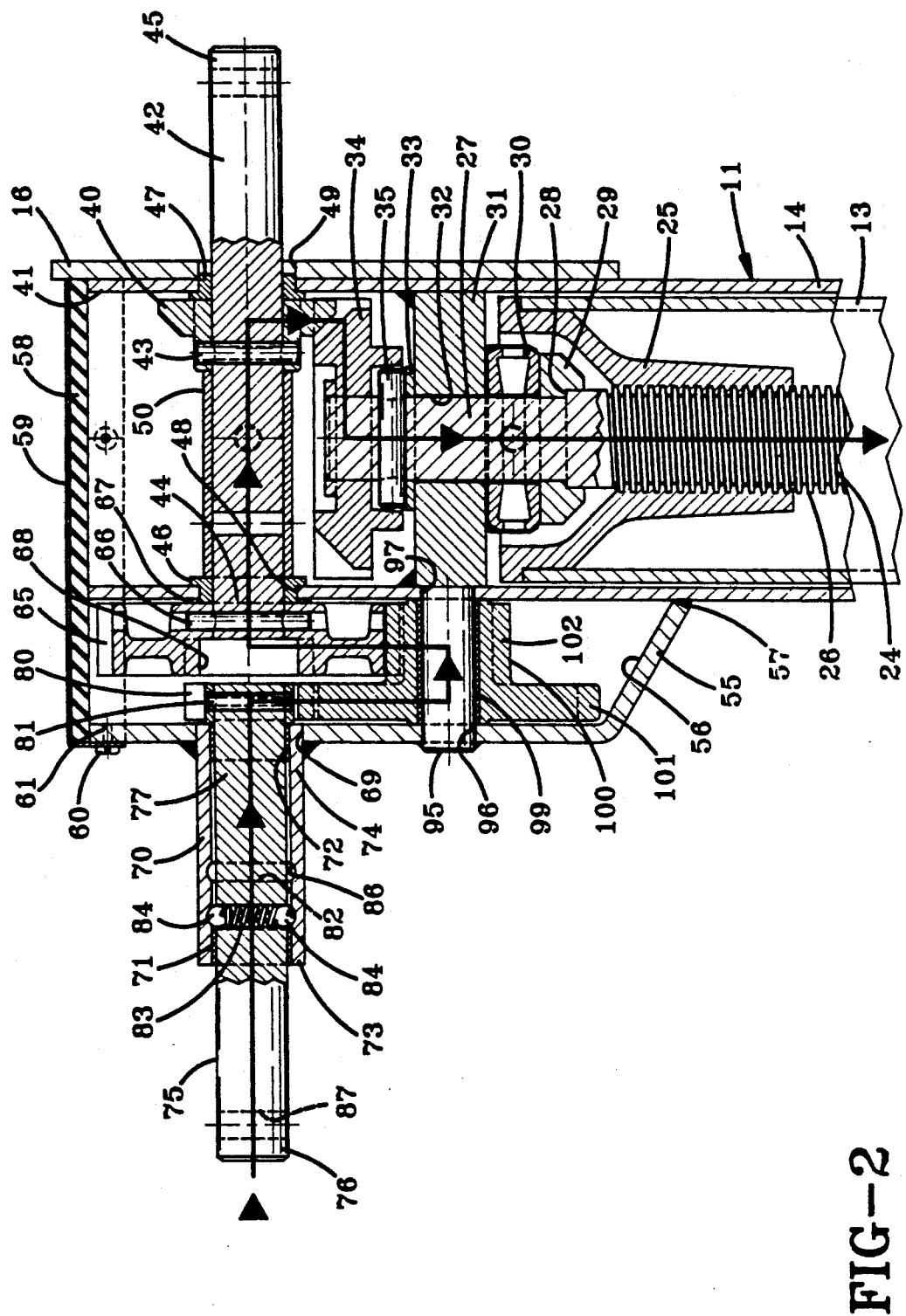
FIG. 2 is a section taken on line 2—2, of FIG. 1, showing the double reduction gear assembly engaged in low gear or the low speed position.
Figure 3:
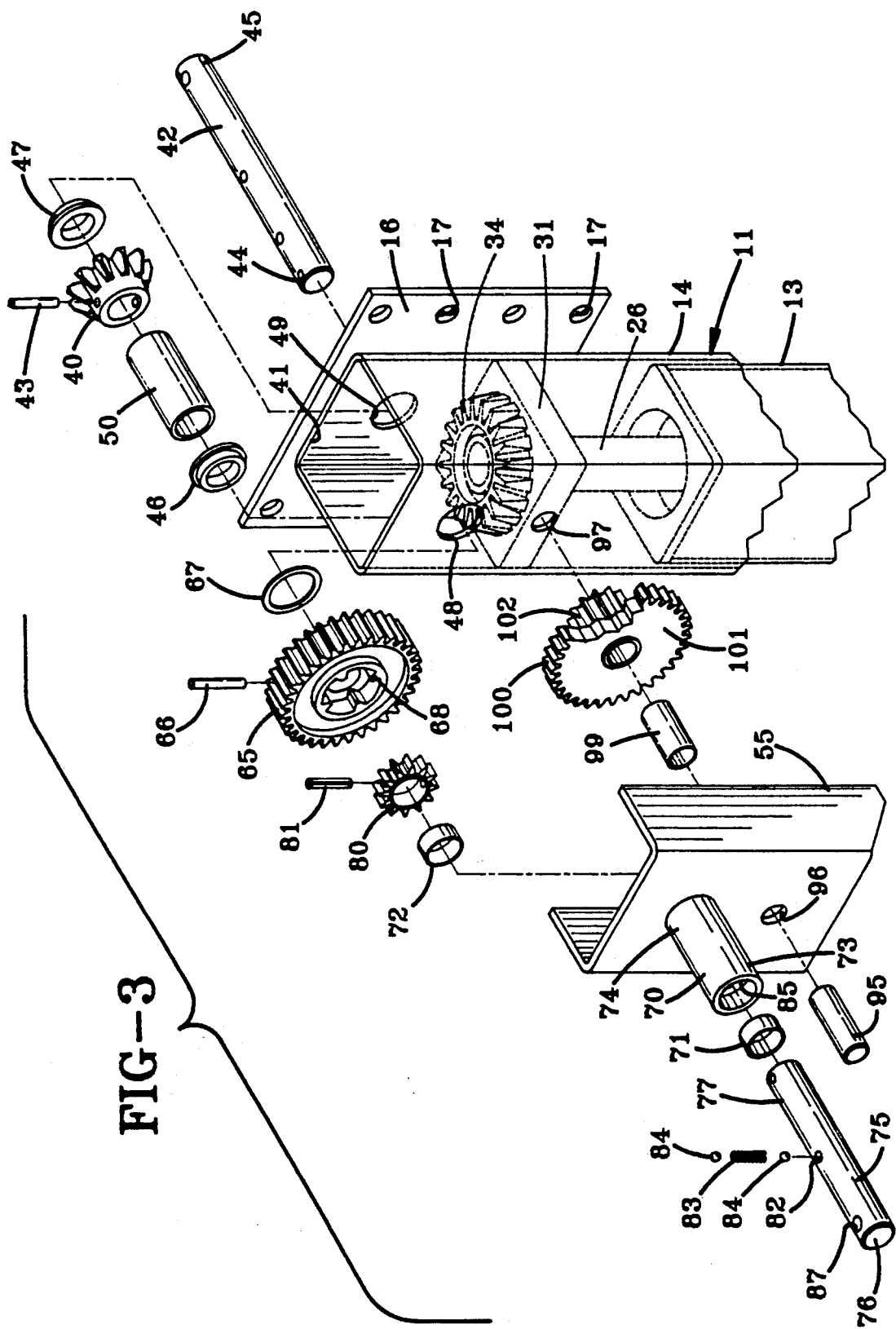
FIG. 3 is an exploded fragmentary perspective view, with portions broken away and hidden parts shown by dashed lines, of the gear assembly of FIG. 2.
Figure 4:
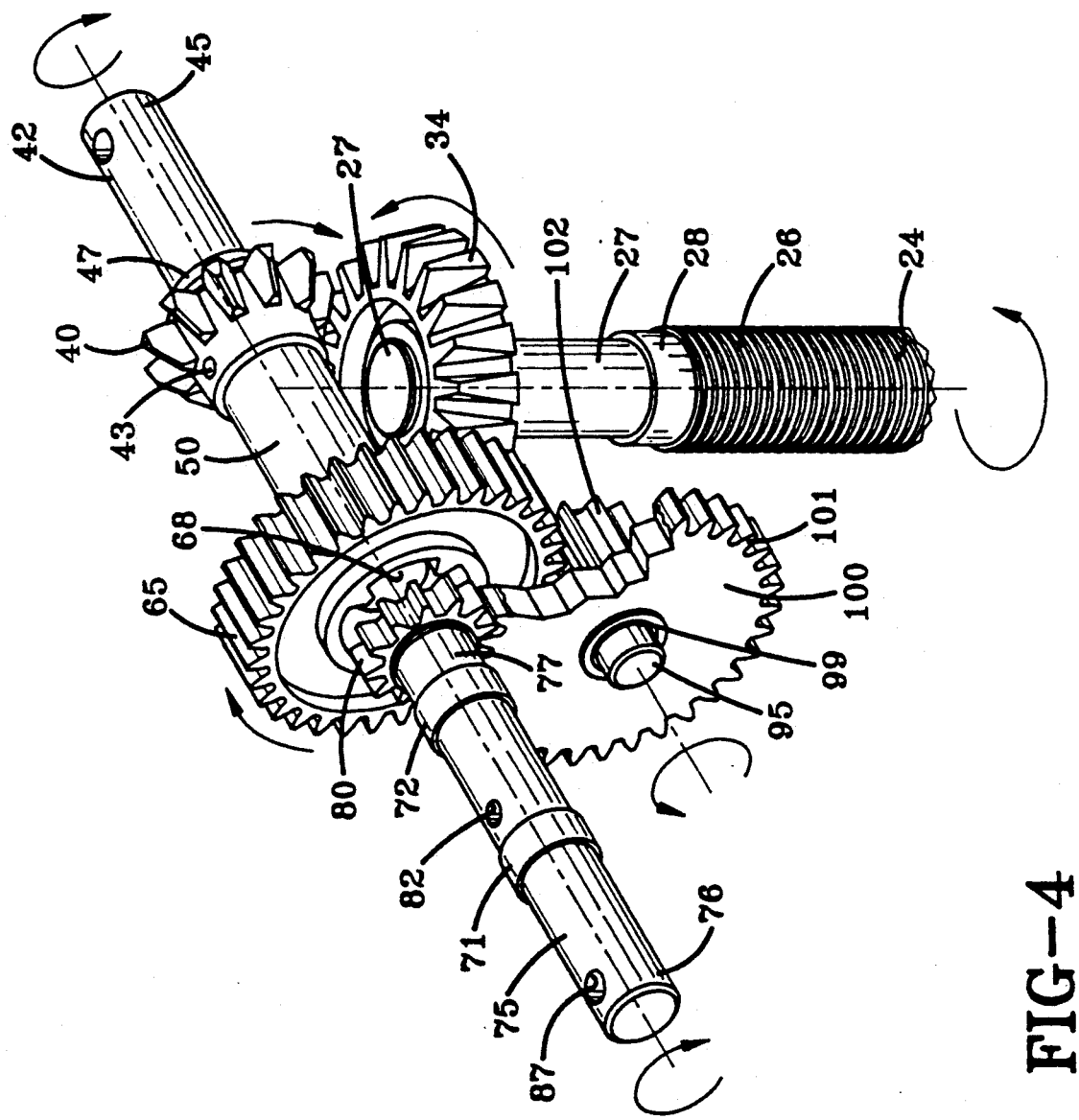
FIG. 4 is a fragmentary perspective view, with portions broken away, of the two speed double reduction gear assembly of the landing gear of the present invention, showing the gears engaged in low gear as in FIG. 2.

In accordance with another of the main features of the present invention, a gear 65 is mounted on first end 44 of output shaft 42 by a pin 66 in a usual manner, and is spaced from the outboard wall of upper leg tube 14 by a washer 67 (FIGS. 2, 3 and 4). Spacer tube 50, by maintaining bushings 46, 47 and bevel pinion 40 in their intended positions and preventing lateral movement of output shaft 42, further maintains gear 65 in its proper lateral orientation in gear case compartment 56. The outboard central portion of gear 65 is formed with a spline slot 68. An opening 69 formed in gear case 55 is generally aligned with spline slot 68, and the second end of a sleeve 70 having first and second ends 73 and 74, respectively, is disposed therein and welded to the gear case. A pair of bushings 71 and 72 are fitted in first and second ends 73 and 74, respectively, of sleeve 70 and is in-line with output shaft 42. An input shaft 75 having first and second ends 76 and 77, respectively, is slidably mounted in bushings 71, 72 of sleeve 70 and is in-line with output shaft 42. Second end 77 of input shaft 75 has a pinion gear or spline 80 secured thereon by a pin 81 in a usual manner. A transverse continuous cylindrical opening 82 is formed in a central portion of input shaft 75. A detent spring 83 having a detent ball 84 disposed on each of its ends is fitted within opening 82 for positively engaging first and second annular recesses 85 and 86, respectively, formed in the interior surface of first end 73 of sleeve 70. A transverse continuous cylindrical opening 87 is formed in first end 76 of input shaft 75, for receiving a bolt 88 (FIG. 1) or other means for fastening a crank handle 89 to input shaft 75. A fixed shaft 95 is mounted in gear case compartment 56 below gear 65 and pinion gear 80. More specifically, shaft 95 extends between and is fitted in aligned openings 96 and 97 formed in gear case 55 and the outboard wall of upper leg tube 14, respectively. Shaft 95 is maintained in a non-rotational fixed position by welding to gear case 55. A bushing 99 is disposed on shaft 95, and an intermediate gear 100 containing two sets of gear teeth 101 and 102 for meshing with pinion gear 80 and gear 65, respectively, is rotatably mounted on bushing 99.

Figure 6:
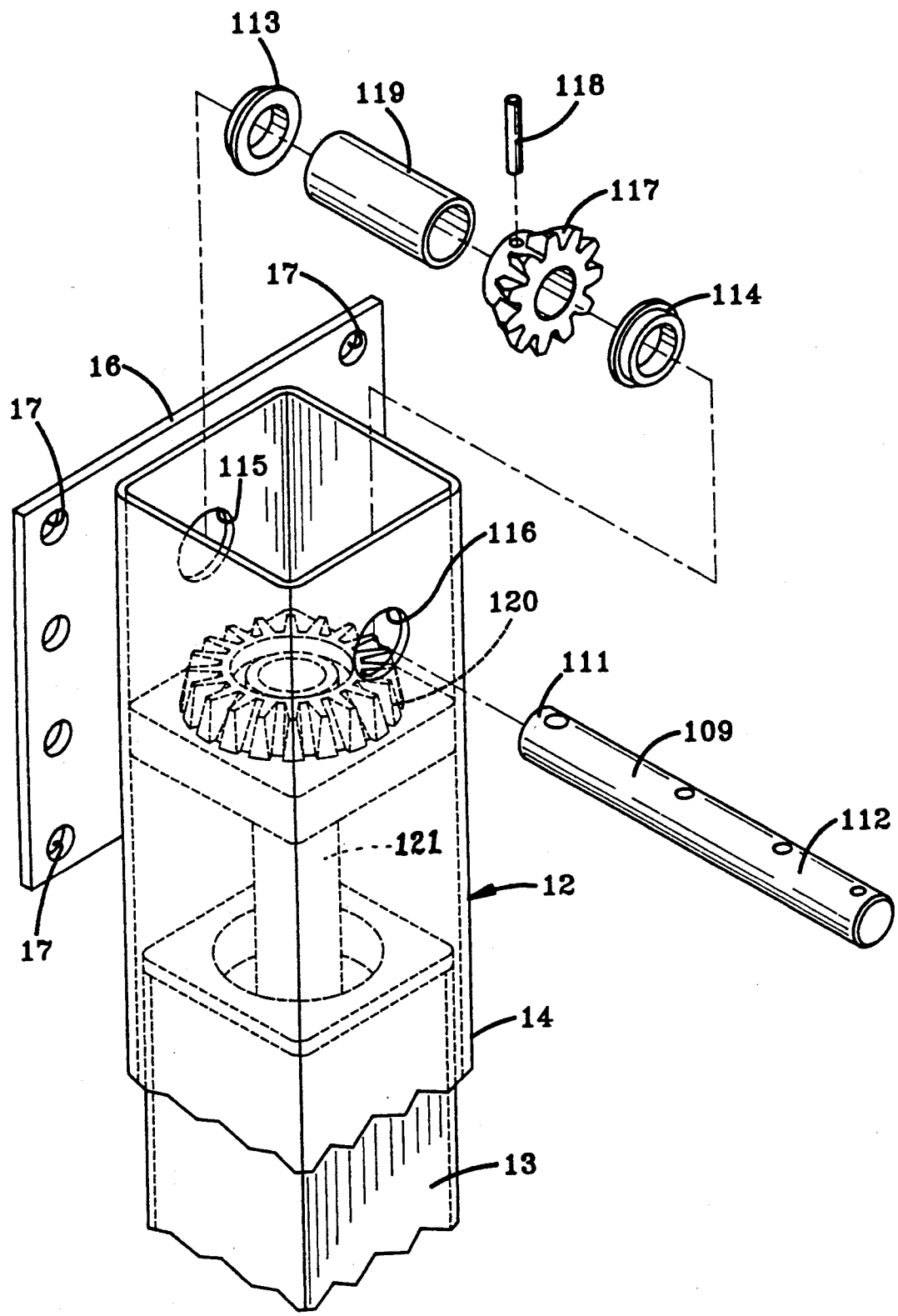
FIG. 6 is exploded fragmentary perspective view, with hidden parts shown by dashed lines, of the gear assembly of the opposite-side leg of the landing gear of the present invention, shown adapted for mounting on an outboard position on a semitrailer frame.
Figure 6A:
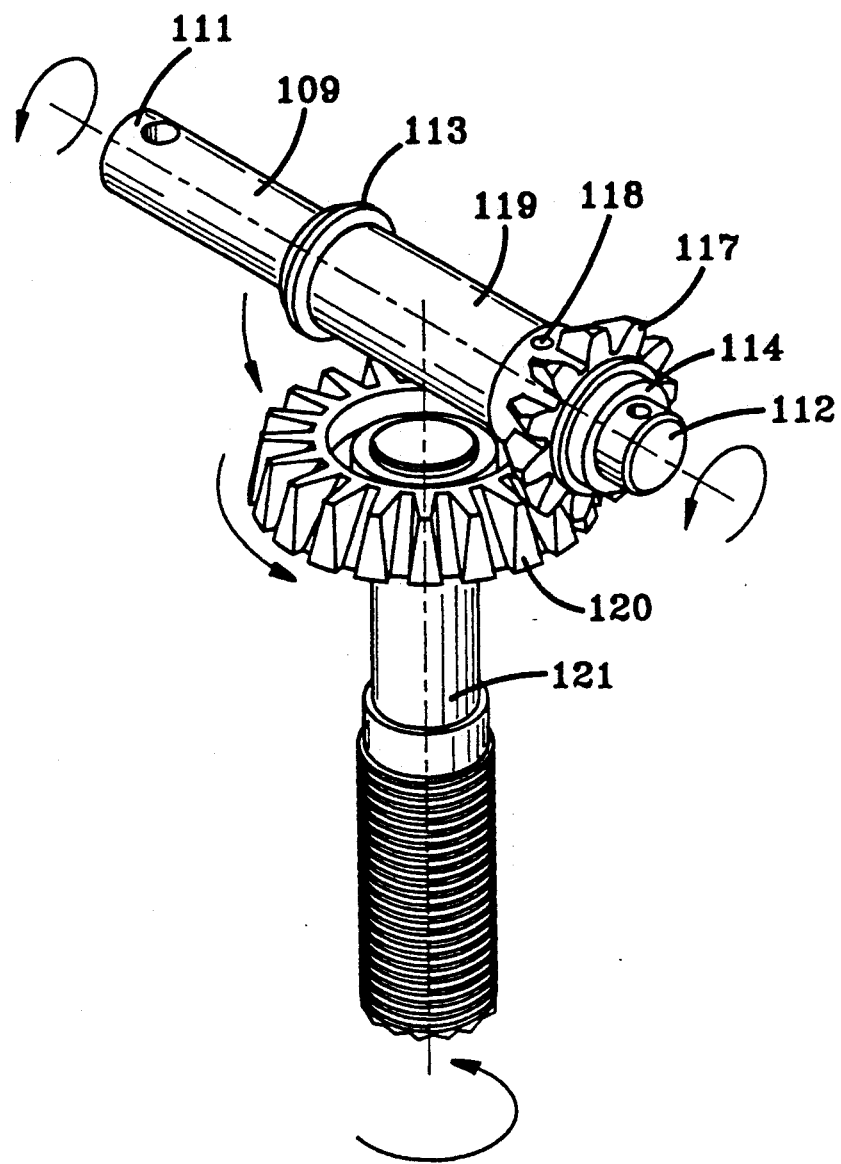
FIG. 6A is a fragmentary perspective view of the gear assembly of the opposite-side leg of FIG. 6, showing the manner in which the gears mesh.

As shown in FIG. 5A, a connecting shaft 106 extends between and is secured at each of its ends by fasteners 107 and 108 such as bolts and the like, to second end 45 of output shaft 42 of leg 11 and to an input shaft 109 of leg 12, respectively. The internal components contained in the right or curb-side leg 12 of landing gear 10 are similar to those contained in the lower and upper leg tubes 13, 14 of left or driver's side leg 11, and are illustrated in FIGS. 6 and 6A. Briefly, input shaft 109 includes first and second ends 111 and 112, respectively, which are rotatably mounted in bushings 113 and 114, which in turn are fitted in aligned openings 115 and 116 formed in the inboard and outboard walls of upper leg tube 14. A bevel pinion 117 is securely mounted on second end 112 of output shaft 109 by a pin 118 in a usual manner. A spacer tube 119 maintains bushings 113, 114 and bevel gear 117 in their intended positions to prevent lateral movement of input shaft 109. Bevel pinion 117 meshes with a bevel gear 120 which in turn is disposed on an elevating screw shaft 121 in a manner similar to bevel gear 34 of driver's side leg 11. The structure and manner of mounting screw shaft 121 in curb-side leg 12 is similar to that described above for the mounting of screw shaft 26 in driver's side leg and such description is hereby fully incorporated by reference.

Figure 1A:
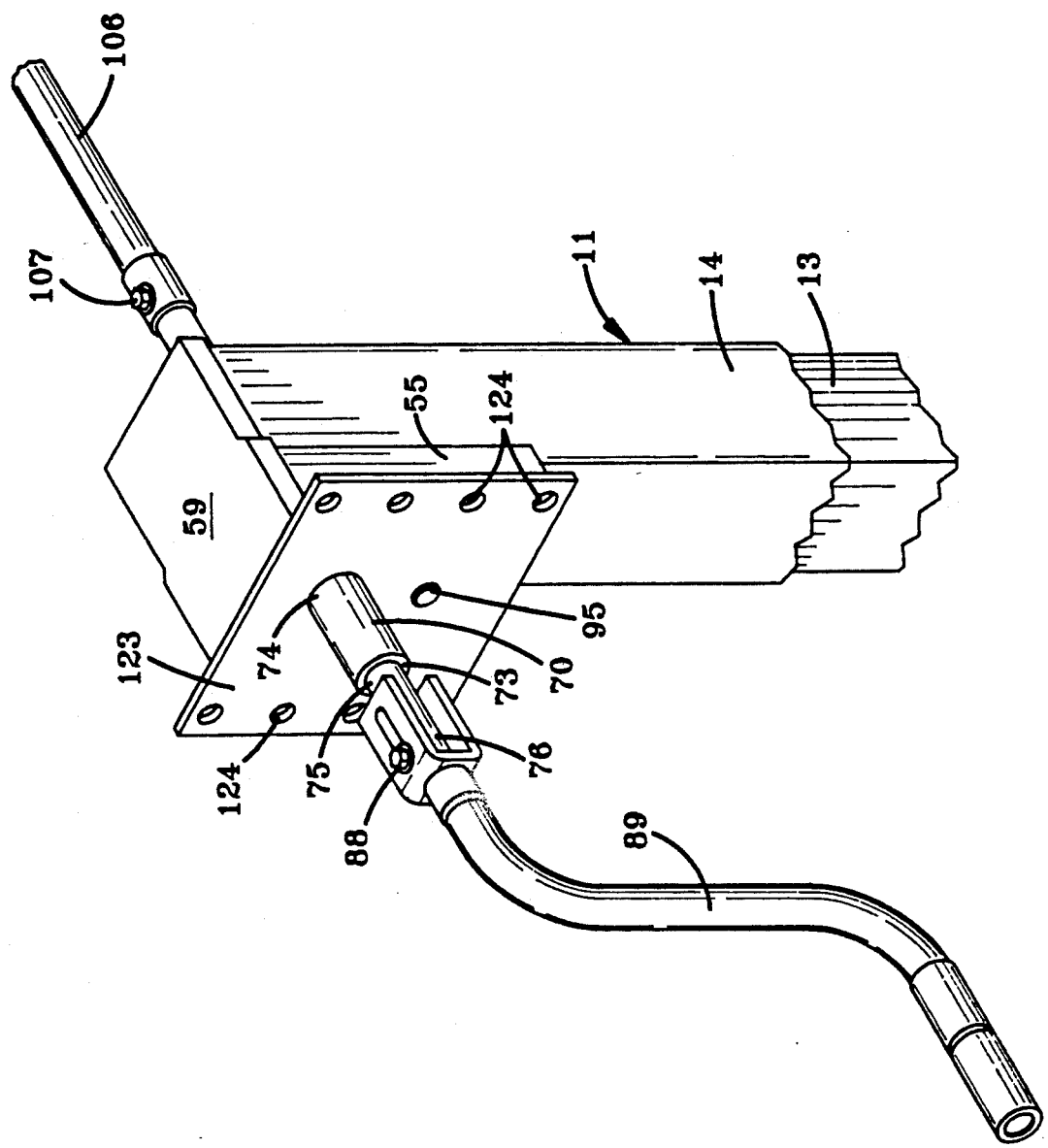
FIG. 1A is a fragmentary perspective view of the first embodiment of the two speed double reduction gear assembly of the cranking leg of the landing gear of the present invention, shown adapted for mounting on an inboard position on a semitrailer frame.
Figure 1B:
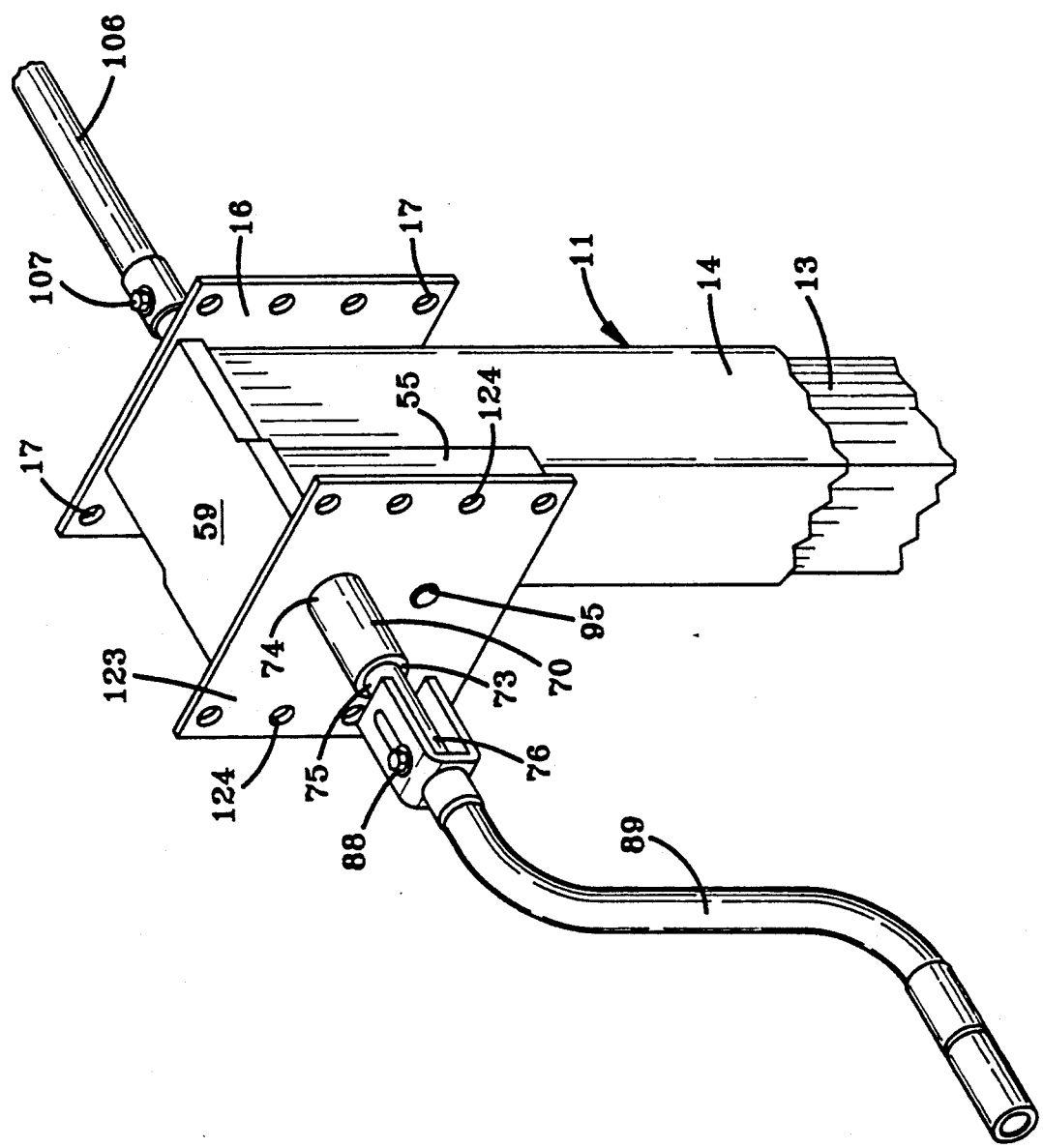
FIG. 1B is a fragmentary perspective view of the first embodiment of the two speed double reduction gear assembly of the cranking leg of the landing gear of the present invention, shown adapted for universal mounting either on an inboard or an outboard position on a semitrailer frame.
Figure 5B:
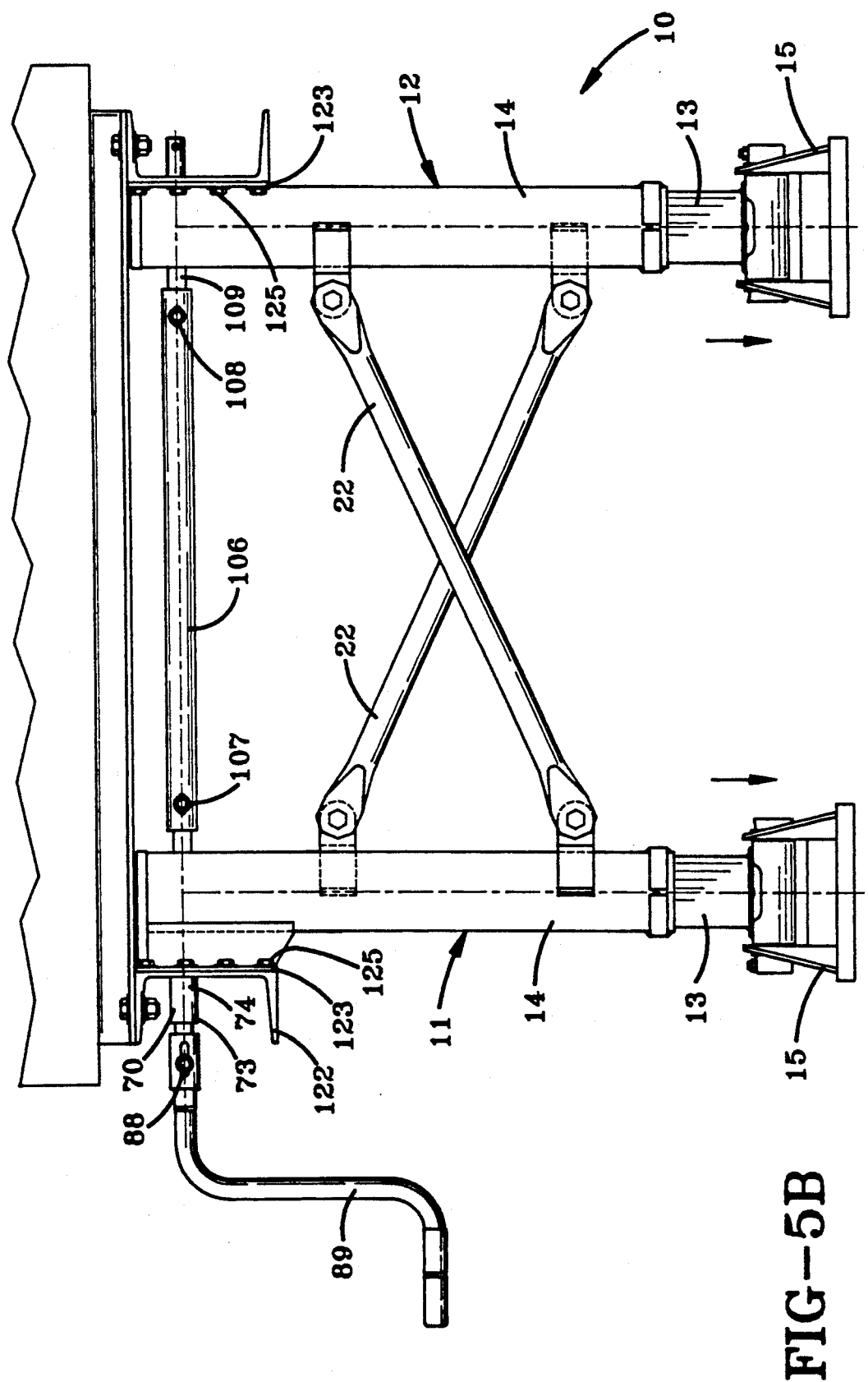
FIG. 5B is a view similar to FIG. 5A, showing the landing gear of FIG. 1A mounted on an inboard position on the semitrailer frame.

If it is desired to mount legs 11 and 12 on an inboard surface of a semitrailer frame 122 (FIG. 5B), a flange plate 123 is attached to an outboard surface of gear case 55 by any suitable means such as welding (FIG. 1A), and preferably also functions as a part of the gear case. Each protruding end of flange plate 123 is formed with a plurality of openings 124 for receiving fastening means 125 such as bolts or the like, for attachment of legs 11, 12 to semitrailer frame 122. If desired, legs 11 and 12 can each have both flange plates 16 and 123 attached thereto (see FIG. 1B), so that legs 11, 12 of landing gear 10 may be attached either to the outboard or inboard surfaces of a semitrailer frame.

Landing gear 10 of the present invention is operated in the following manner when it is desired to work the landing gear in low gear or low speed, wherein the ratio of turns of crank handle 89 to vertical distance of travel of legs 11, 12 is high, but wherein the mechanical advantage enjoyed by the operator of the landing gear also is high. More particularly, this ratio is from about 15 to about 50, desirably from about 20 to about 40, and preferably from about 25 to about 35 turns per inch, which generally are standard ratios. Landing gear 10 is shown in the low gear in FIGS. 2 and 4. To lower upper leg tube 14 with respect to lower leg tube 13 of the driver's side and curb side legs 11 and 12, respectively, in low speed, input shaft 75 is manually slidably moved to its outwardmost position by applying a pulling force to crank handle 89, so that detent balls 84 are positively engaged with first annular recess 85. Crank handle 89 and attached input shaft 75 then are manually rotated in a clockwise direction as shown by the arrow in FIG. 4, whereby pinion gear 80 meshes with first teeth 101 of intermediate gear 100 for rotating the intermediate gear in a counterclockwise direction. In transmitting the rotary motion of input shaft 75 from pinion gear 80 to first teeth 101 of intermediate gear 100, a first reduction having a magnitude of about 2.75 is achieved. As is well known to those of ordinary skill in the art, in practical terms, such a reduction means that intermediate gear 100 is rotating about 2.75 times slower than input shaft 75, but a gain in mechanical advantage of a magnitude of about 2.75 is at the same time realized by the operator of landing gear 10. That is, due to the reduction achieved in transmitting rotary motion from pinion gear 80 to first teeth 101 of intermediate gear 100, the operator will find that crank handle 89 is about 2.75 times easier to turn than without such a reduction.

Second gear teeth 102 of intermediate gear 100, which also are rotating in a counterclockwise direction with integral first teeth 101, mesh with gear 65 thereby rotating it in a clockwise direction which in turn rotates output shaft 42 in a clockwise direction. The transmission of rotary motion from second teeth 102 of intermediate gear 100 to gear 65 results in a second reduction also having a magnitude of about 2.75, with reduction having the meaning as defined immediately above. Thus, the total reduction obtained is the product of the first and second reductions, or 2.75×2.75=7.56. Thus, in practical terms, although gear 65 and attached output shaft 42 turn about 7.56 times slower than input shaft 75, the operator enjoys an increase in mechanical advantage by a factor of about 7.56. Clockwise-rotating bevel pinion 40 meshes with bevel gear 34 to rotate the bevel gear and attached screw shaft 26 in a counterclockwise direction.

A third reduction having a magnitude of about 2.0 occurs in going from bevel pinion 40 to bevel gear 34, resulting in an overall reduction of 2.0×7.56 equalling about 15, meaning that screw shaft 26 turns about 15 times slower than input shaft 75 in low gear. However, landing gear 10 of the present invention would be customarily referred to in the art and literature as a double reduction assembly based on the two reductions which take place within gear case 55. Most prior art landing gear have a single or double reduction which takes place in the gear case, as well as another reduction which takes place at the junction of the output shaft and the elevating screw shaft. However, such landing gear are identified as single reduction or double reduction based on the number of reductions which take place in the gear case compartment alone. Therefore, the total reduction of about 15, when combined with the screw lead pitch of about 2.25 of threaded lower shaft 24 of elevating screw shaft 26, results in a low gear ratio of crank handle turns to vertical travel distance of 2.25×15 equalling about 34 turns per inch. This means that, in low gear, for every 34 turns of crank handle 89, screw shaft 26 will travel one inch in vertical distance. Although screw shaft 26 is turning about 15 times slower than input shaft 75, the operator enjoys a mechanical advantage of a magnitude of about 15, that is, crank handle 89 turns about 15 times easier than it would without such a reduction. Rotation of screw shaft 26 in nut 25 in the counterclockwise direction causes downward movement of the screw shaft in the nut resulting in retraction of lower leg tube 13 within upper leg tube 14.

Output shaft 42 simultaneously rotates connecting shaft 106 in a clockwise direction, which in turn rotates input shaft 109 of leg 12 in a clockwise direction as shown in FIG. 6A. Attached clockwise-rotating bevel pinion 117 meshes with bevel gear 120 to rotate the bevel gear and attached screw shaft 121 in a counterclockwise direction in a manner similar to the rotation of screw shaft 26 of driver's side leg 11, for retracting lower tube 13 in upper leg tube 14. Of course, it is understood that rotation of crank handle 89 in the opposite or counterclockwise direction results in opposite movement of all of the above-described components of landing gear 10, which in turn results in extension of lower leg tube 13 from upper leg tube 14 in both legs 11, 12.

Figure 2A:
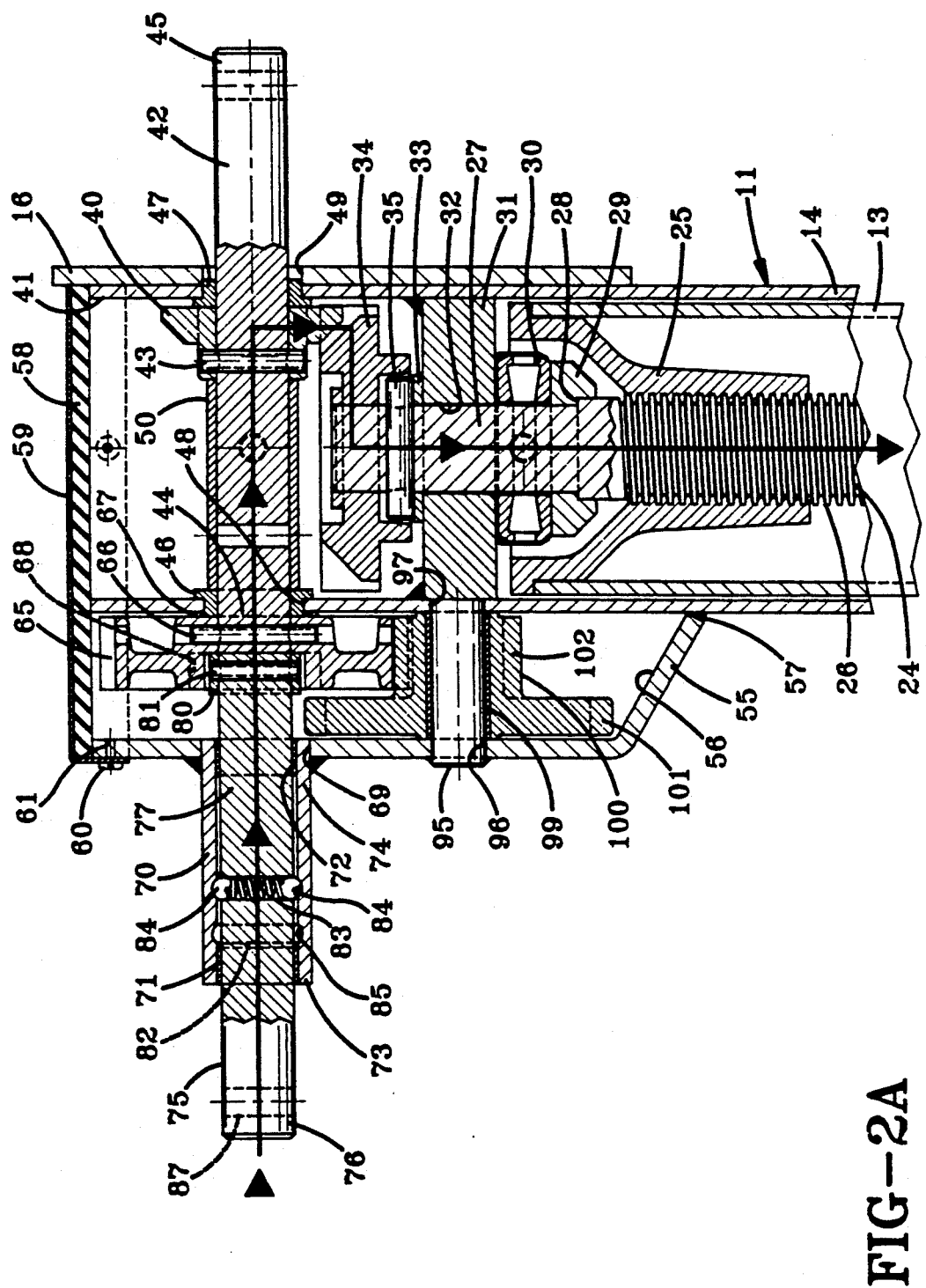
FIG. 2A is a view similar to FIG. 2, showing the gear assembly shifted inwardly and engaged in high gear or the high speed position.

In accordance with another of the main features of the present invention, when it is desired to work landing gear 10 in high gear or high-speed, wherein the ratio of turns of crank handle 89 to vertical distance of travel of legs 11, 12 is low, but wherein the mechanical advantage realized by the operator also is low, the landing gear is operated in the following manner. Such ratio is from about 2 to about 5, desirably from about 3 to about 4.5, and preferably from about 4 to about 4.5 turns per inch, which generally are standard ratios. Landing gear 10 is shown in high gear in FIGS. 2A and 4A. To lower upper leg tube 14 with respect to lower leg tube 13 of the driver's side and curb-side legs 11 and 12, respectively, in high speed, input shaft 75 is manually slidably moved to its inwardmost position by applying a pushing force to crank handle 89, so that detent balls 84 disengage from first annular recess 85 and positively engage second annular recess 86. Such inward movement of input shaft 75 from the outermost position shown in FIGS. 2 and 4 to the innermost position shown in FIGS. 2A and 4A causes pinion gear 80 to slidably engage spline slot 68 of gear 65. It is important to note that the relatively small size of pinion gear 80, which must be moved through heavy lubricating grease contained in gear case compartment 56 during shifting between gears, results in an apparatus with improved shifting ease. More particularly, this grease offers resistance to the movement of pinion gear 80 therethrough, and makes such movement particularly difficult in cold weather conditions when the grease is more viscous. However, the small size of pinion gear 80 relative to many prior art gears which must be shifted through such lubricating grease, substantially reduces the effect of the grease resistance. Moreover, the relatively short horizontal distance between first and second annular recesses 85 and 86 of about ⅛ inch, which is less than many prior art devices which require an inward movement of a gear of about 1¼ inch to accomplish a similar shift from one gear speed to another gear speed, also aids in improving the shifting ease of the apparatus of the present invention. Thus, such a spline shifting or "clutch shifting" apparatus is more efficient than many known prior art landing gear shifting apparatus, including "constant gear mesh" designs.

Figure 4A:
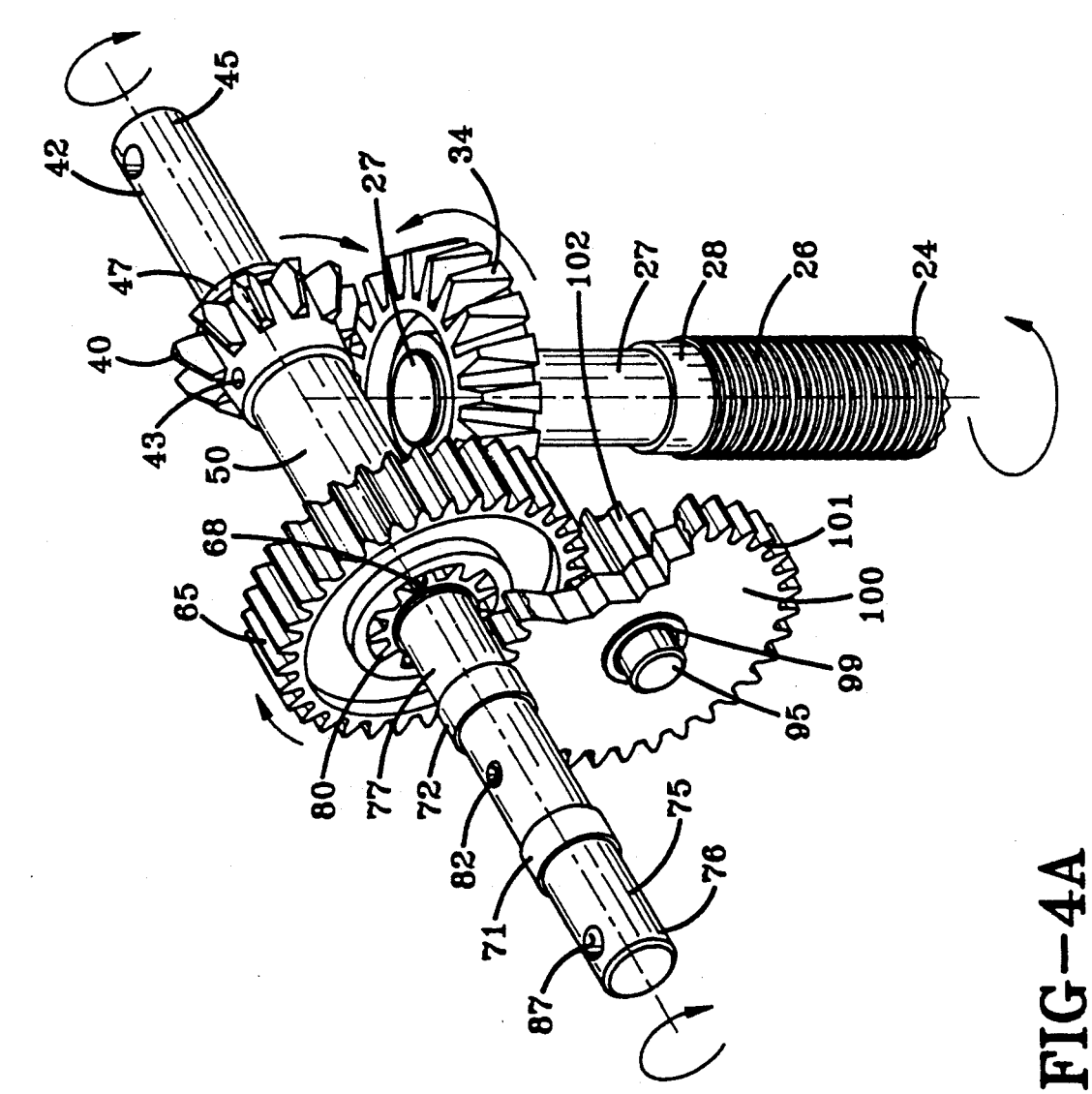
FIG. 4A is a view similar to FIG. 4, showing the gear assembly engaged in high gear as in FIG. 2A.

Crank handle 89 then is manually rotated in a clockwise direction as shown in FIG. 4A whereby clockwise rotating input shaft 75 rotates attached pinion gear 80 in a clockwise direction, which in turn rotates engaged gear 65 and attached output shaft 42 in a clockwise direction. Attached bevel pinion 40 rotates in a clockwise direction and meshes with bevel gear 34 to rotate the bevel gear and attached screw shaft in a counterclockwise direction. As discussed above, the reduction in going from bevel pinion 40 to bevel gear 34 is of a magnitude of about 2.0, which is the only reduction which occurs in high gear, and when combined with the screw lead pitch of about 2.25 of threaded lower shaft 24 of elevating screw shaft 26, results in a high gear ratio of crank handle turns to vertical travel distance of 2.25×2.0 equalling about 4.5 turns per inch. More specifically, this means that in the high gear, for every 4.5 turns of crank handle 89, screw shaft 26 travels about one inch in a vertical direction, or faster than in low gear. However, it should be noted that when landing gear 10 is in high gear or high-speed, the operator conversely only enjoys a mechanical advantage of a magnitude of about 2.0 with screw shaft 26 turning only about 2 times slower than input shaft 75, as compared to a mechanical advantage of about 15 in low gear. Rotation of screw shaft 26 in nut 25 in the counterclockwise direction causes downward movement of the screw shaft in the nut resulting in retraction of lower leg tube 13 in upper leg tube 14. Operatively connected curb-side leg 12 simultaneously operates in a similar manner as described above for the description of the operation of landing gear 10 in low speed. Of course, it is understood that rotation of crank handle 89 in the opposite or counterclockwise direction results in opposite movement of all of the above-described components of landing gear 10, which in turn results in extension of lower leg tube 13 from upper leg tube 14 in both legs 11, 12.

It should be noted and is understood that depending on whether screw shaft 26 and nut 25 are threaded in a right-hand or a left-hand direction, rotation of crank handle 89 in a given direction will cause lower leg tube 13 either to retract within or extend from upper leg tube 14.

Figure 7:
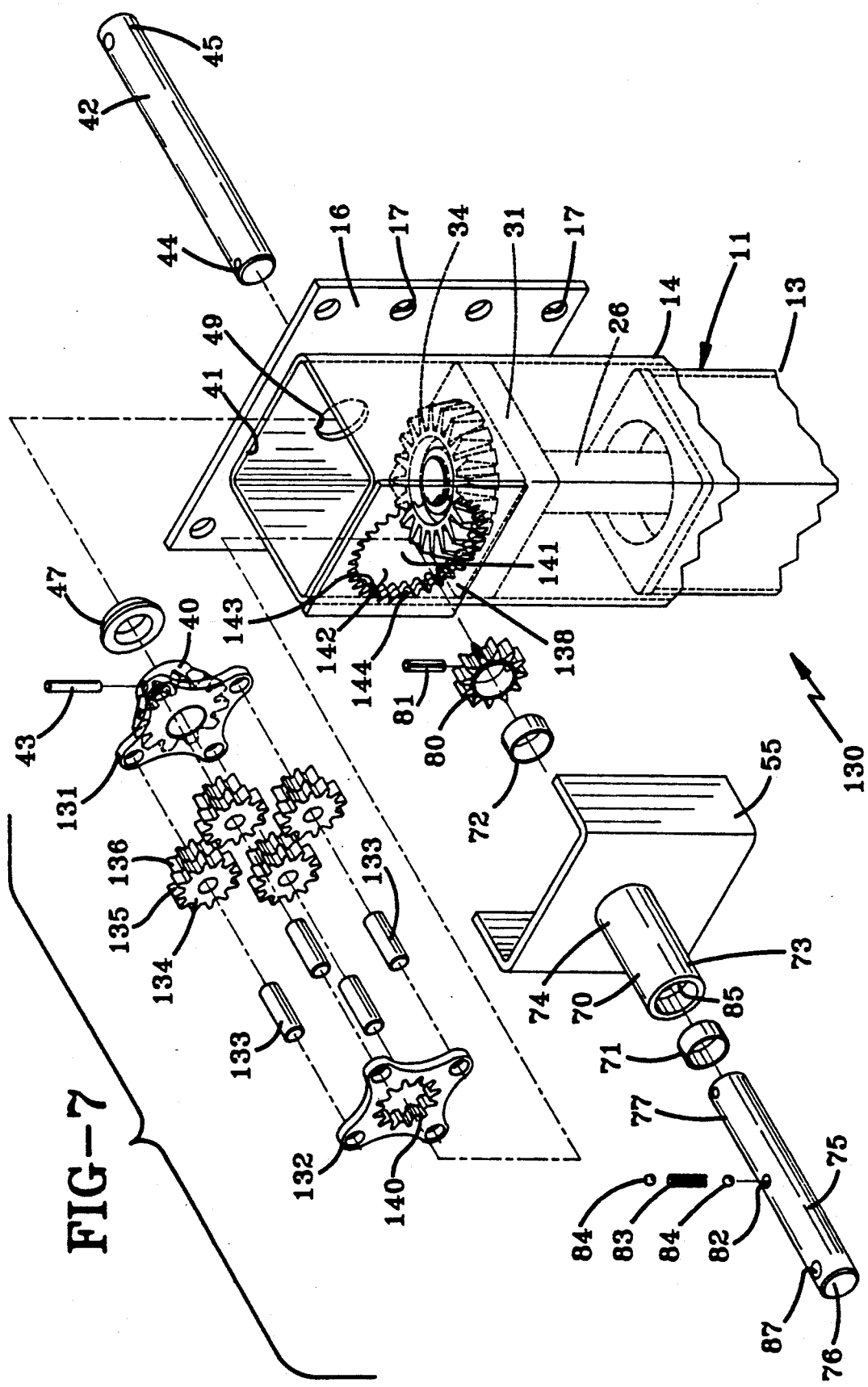
FIG. 7 is an exploded fragmentary perspective view, with hidden parts shown by dashed lines, of a second embodiment of the two speed double reduction gear assembly of the cranking leg of the landing gear of the present invention, shown adapted for mounting on an outboard position on a semitrailer frame.
Figure 8:
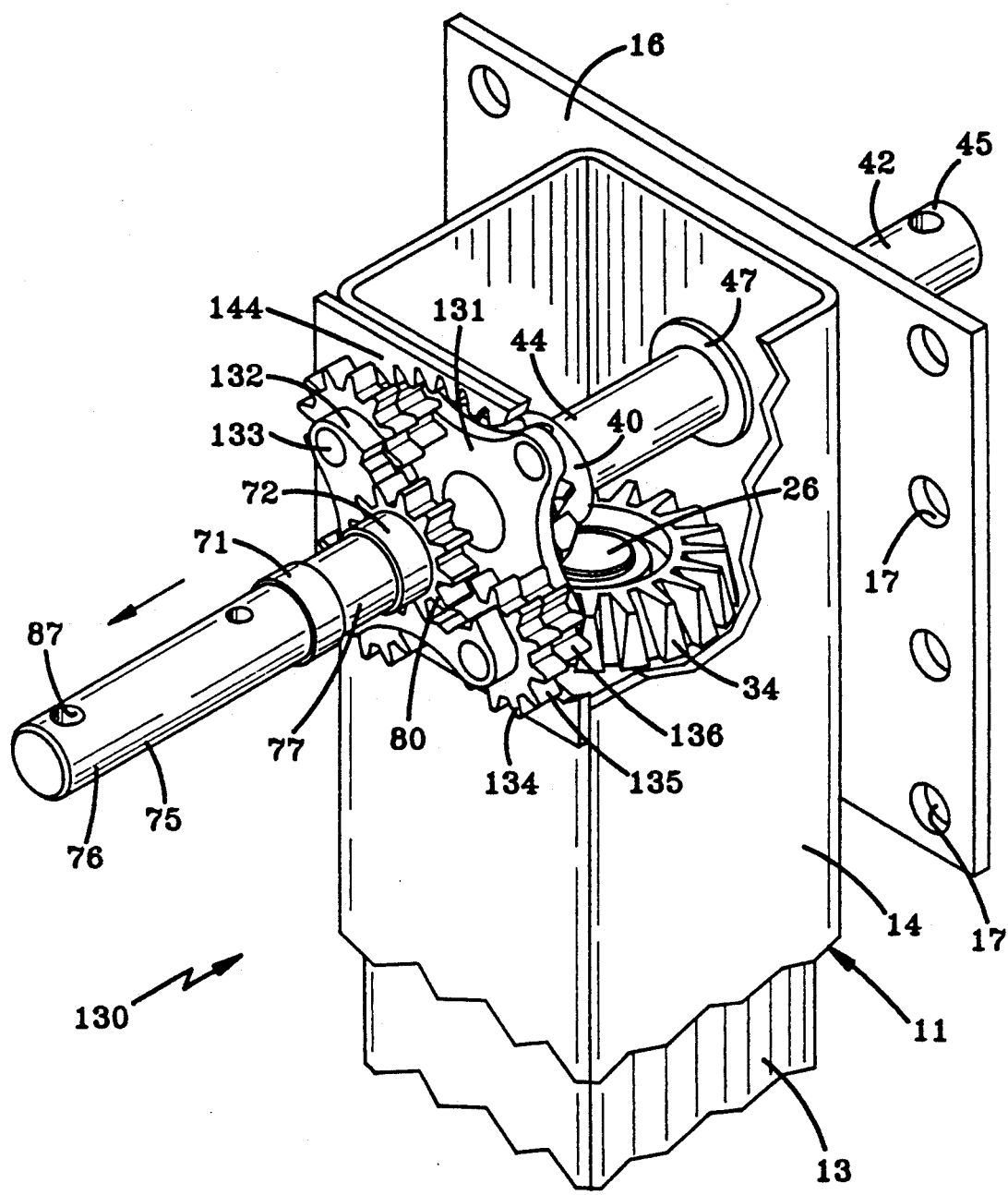
FIG. 8 is a fragmentary perspective view, with portions broken away, of the gear assembly of FIG. 7, showing the gears engaged in high gear or the high speed position.
Figure 9:
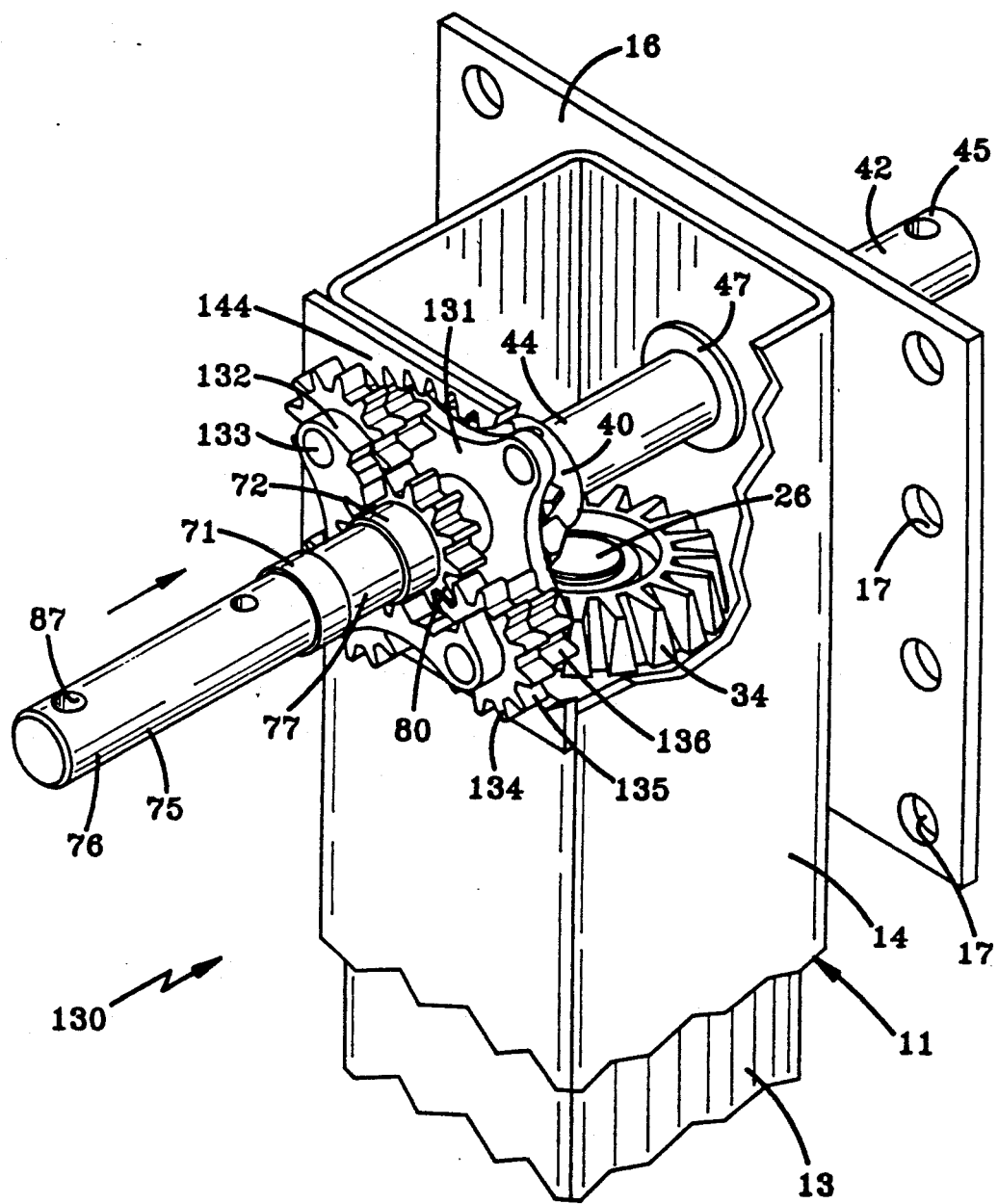
FIG. 9 is a view similar to FIG. 8 showing the gear assembly shifted inwardly and engaged in low gear or the low speed position.

A second embodiment of the landing gear for semitrailers of the present invention is indicated generally at 130 and is shown in FIGS. 7 through 9. Second embodiment 130 is similar to first embodiment 10 in many respects, excepting the structure, arrangement and operation of the gears used to achieve the double reduction mechanical advantage, and in particular the structure, arrangement and operation of gears disposed on and about output shaft 42. The structure, arrangement and operation of the other components of landing gear 130 are similar to those described above for landing gear 10, which description is hereby fully incorporated by reference with regard to landing gear 130.

Specifically, an output stub 131 is welded to the outboard face of bevel pinion 40, which in turn is secured on first end 44 of output shaft 42 by pin 43 in a usual manner. Second end 45 of output shaft 42 passes through bushing 47 which in turn is fitted in opening 49 formed in the inboard wall of upper tube 14 of leg 11. An increased-diameter opening 141 is formed in the outboard wall of upper leg tube 14 and is generally aligned with opening 49 of the inboard wall. A plate 138 formed with an opening 142 of similar diameter to opening 141 is welded to the outboard wall of upper leg tube 14, so that openings 141 and 142 are generally aligned. The circumference of openings 141 and 142 are formed with first and second sets 143 and 144 of cooperative internal gear teeth, respectively. An input carrier 132 formed with a spline slot 140 is disposed in gear case compartment 56, and is secured to output stub 131 in a spaced relationship by a plurality of dowel pins 133 which extend between and are attached to the output stub and the input carrier. A planet pinion 134 having a first set of gear teeth 135 and a second reduced diameter set of gear teeth 136 is rotatably disposed on each dowel pin 133 for free rotation thereon between output stub 131 and input carrier 132.

The second embodiment 130 of the landing gear for semitrailers of the present invention is operated in the following manner. It is understood that although the structure, arrangement and operation of the double reduction gear assembly of second embodiment landing gear 130 is different than that of first embodiment landing gear 10, the concept of the invention is the same for both embodiments, including the ratios of turns of crank handle 89 to vertical distance of travel of legs 12 and magnitudes of mechanical advantage achieved described above for landing gear 10, which ratio and magnitude values are fully incorporated by reference herein for the description of landing gear 130. When it is desired to operate landing gear 130 in high gear or high speed, input shaft 75 is manually slidably moved to its outermost position by applying a pulling force to crank handle 89, so that detent balls 84 are positively engaged with first annular recess 85. Such outward movement of input shaft 75 causes pinion gear 80 to slidably engage spline slot 140 of input carrier 132 (FIG. 8). Crank handle 89 and attached input shaft 75 then are manually rotated in the desired direction for raising or lowering upper leg tube 14 with respect to lower leg 13 of the driver's side and curb-side legs 11 and 12, respectively. Rotation of crank handle 89 and attached input shaft 75 in the desired direction for retraction or extension of lower leg tube 13 with respect to upper leg tube 14, in turn causes rotation of attached pinion gear 80 and engaged input carrier 132. Input carrier 132 in turn rotates output stub 131 and attached bevel pinion 40 which meshes with bevel gear 34, and second set of gear teeth 136 of planet pinions 134 mesh with internal gear teeth 143, 144 to generally stabilize the rotating assembly. The structure, arrangement and operation of the remaining components of landing gear 130 is similar to that described above for landing gear 10, which description has been fully incorporated by reference.

When it is desired to shift to low gear or low speed, a pushing force is applied to crank handle 89 for manually slidably moving input shaft 75 to its inwardmost position, wherein detent balls 84 disengage from first annular recess 85 and positively engage second annular recess 86. As a result of such inward movement of input shaft 75, pinion gear 80 disengages from spline slot 140 of input carrier 132, and meshes with first set of gear teeth 135 of planet pinions 134 (FIG. 9), whereby a first reduction occurs in transmitting rotary motion from pinion gear 80 to first gear teeth 135 of planet pinions 134. Second gear teeth 136 of planet pinions 134 mesh with internal gears 143, 144 of upper leg tube 14 and attached plate 138, respectively, for achieving a second reduction. The epicyclic rotation of planet pinions 134 within internal gears 143, 144 causes corresponding rotation of outward stub 131 and attached bevel pinion 40, Which in turn meshes with bevel gear 34. Again, the structure, arrangement and operation of the remaining components of landing gear 130 is similar to that described above for landing gear 10, which description has been fully incorporated by reference.

In summary, important features of the present invention include a landing gear for semitrailers having a two speed double reduction gear assembly, in which the gear assembly is comprised of fewer, smaller and simpler parts mounted on and about in-line input and output shafts, resulting in an easy to manufacture and assemble, compact, low-cost landing gear unit. This reduction in the number, size and complexity of parts results in an easy to crank and shift unit capable of achieving standard crank handle turn to vertical leg travel distance ratios, wherein the low speed ratio could be fixed within a broad range during manufacture of the unit, if desired, without substantially increasing the overall size or complexity of the two speed double reduction gear assembly. The landing gear of the present invention is durable and simple to use, and can include a universal mounting feature.

While in accordance with the Patent Statutes, the best mode and preferred embodiments have been set forth, the scope of the invention is not limited thereto, but rather by the scope of the attached claims.

What is claimed is:

1. A two speed landing gear assembly for a semitrailer, comprising:
   a) first and second upright telescopic legs mounted in a laterally spaced relationship generally adjacent to a front end of said semitrailer;
   b) in-line laterally-oriented input and output shafts rotatably mounted on said first leg, said output shaft being operatively connected to an input shaft rotatably mounted on said second leg; and
   c) gear means mounted on and generally adjacent to each of said shafts for operating said landing gear in a high gear and a low gear, said input shaft on said first leg being axially movable to allow for shifting between said gears, said gear means achieving a double gear reduction between the input and output shafts when in low gear and providing for direct coupling of the input and output shafts when in high gear, so that upon shifting said gear means of said first leg input and output shafts into low gear, a ratio of turns of said first leg input shaft to inches of vertical travel of said legs of from about 15 to about 50 is achieved, and upon shifting said first leg gear means into high gear, said ratio of from about 2 to about 5 is achieved.

2. The assembly of claim 1, in which said gear means is i) a pinion gear mounted on an inboard end of said first leg input shaft, ii) an intermediate gear mounted on a fixed shaft adjacent to said first leg input shaft, said intermediate gear including an outboard portion having a first set of gear teeth formed thereon and a reduced diameter integral inboard portion having a second set of gear teeth formed thereon, iii) a dual-function gear mounted on an outboard end of said output shaft, said dual-function gear having teeth formed along the circumference thereof and a spline slot formed in an outboard central portion thereof which is complementary in size and shape to said pinion gear, iv) a bevel pinion mounted on said output shaft inboard from said dual-function gear, v) a bevel gear mounted on an upper end of an upright elevating screw shaft mounted within said first leg, vi) a bevel pinion mounted on said second leg input shaft, and vii) a bevel gear mounted on an upper end of an upright elevating screw shaft mounted within said second leg; wherein when said landing gear assembly is operated in low gear, said first leg input shaft and attached pinion gear are rotated and said pinion gear meshes with said first set of gear teeth of said intermediate gear for rotating said intermediate gear, said second set of rotating gear teeth meshing with said gear teeth of said dual-function gear for rotating said dual-function gear and attached output shaft and bevel pinion, said rotating bevel pinion meshing with and rotating said bevel gear for rotating said attached elevating screw shaft, said operatively connected second leg input shaft and attached bevel pinion being simultaneously rotated by said rotating output shaft, said rotating second leg input shaft bevel pinion meshing with and rotating said second leg bevel gear for rotating said attached second leg elevating screw shaft, so that the ratio of turns of said first leg input shaft to inches of vertical travel of said legs is from about 20 to about 40; and further wherein when said gear means is shifted to high gear, said pinion gear engages said complementary-shaped spline slot formed in said dual-function gear for rotating said dual-function gear and attached output shaft and bevel pinion, said rotating bevel pinion meshing with and rotating said bevel gear and attached elevating screw shaft, said output shaft simultaneously rotating said operatively connected second leg input shaft and attached bevel pinion, said rotating second leg input shaft bevel pinion meshing with and rotating said second leg bevel gear for rotating said attached elevating screw shaft, so that the ratio of turns of said first leg input shaft to inches of vertical travel of said legs is from about 3 to about 4.5.

3. The assembly of claim 2, wherein a one-piece bent metal gear box encases said first leg input shaft pinion gear, said intermediate gear, and said dual-function gear and is generally equal in width to said first leg; wherein a crank handle is secured to the outboard end of said first leg input shaft for manual rotation of said shaft; wherein an intermediate portion of said first leg input shaft is formed with a transverse continuous cylindrical opening containing a detent spring and detent balls; wherein a sleeve is mounted on an outboard face of said gear case in alignment with an opening formed in said gear case, said sleeve having outboard and inboard annular recesses formed in an internal surface thereof; wherein said outboard and inboard recesses are spaced apart about ⅜ of an inch; wherein said detent balls engage said outboard and inboard annular recesses when said assembly is in low gear and high gear, respectively; and wherein the ratio of turns of said first leg input shaft to inches of vertical travel of said legs is from about 25 to about 35 in low gear and from about 4 to about 4.5 in high gear.

4. The assembly of claim 3, wherein a flange plate is mounted on an inboard portion of each of said first and second legs for mounting said landing gear assembly on an outboard surface of the semitrailer frame; and wherein the ratio of turns of said first leg input shaft to inches of vertical travel of said legs is about 34 to 1 in low gear and about 4.5 to 1 in high gear.

5. The assembly of claim 3, wherein a flange plate is mounted on an outboard portion of said gear case and forms the outboard portion of said gear case, and is mounted on an outboard portion of said second leg, for mounting said landing gear assembly on an inboard surface of a semitrailer frame; and wherein the ratio of turns of said first leg input shaft to inches of vertical travel of said legs is about 34 to 1 in low gear and about 4.5 to 1 in high gear.

6. The assembly of claim 1, in which said gear means is i) a pinion gear mounted on an inboard end of said first leg input shaft, ii) a bevel pinion mounted on an outboard end of said output shaft, said bevel pinion having an output stub attached to an outboard face thereof, iii) an input carrier formed with a central spline slot which is complementary in size and shape to said pinion gear, said input carrier being mounted in a spaced relationship outboard from said output stub by a plurality of dowel pins which extend between and are attached to said output stub and input carrier, iv) a planet pinion mounted on each of said dowel pins between said output stub and said input carrier, with each of said planet pinions having an outboard portion having a first set of gear teeth formed thereon and an integral reduced diameter inboard portion having a second set of gear teeth formed thereon, v) an internal gear generally formed along the circumference of an opening formed in an outboard wall of said first leg, vi) a bevel gear mounted on an upper end of an upright elevating screw shaft mounted within said first leg, vii) a bevel pinion mounted on said second leg input shaft and, viii) a bevel gear mounted on an upper end of an upright elevating screw shaft mounted within said second leg; wherein when said landing gear assembly is operated in low gear, said first leg input shaft and said pinion gear are rotated and said pinion gear meshes with said first set of gear teeth of said planet pinions for rotating said pinions and attached reduced diameter second set of gear teeth; said rotating second set of gear teeth of said planet pinions meshing with said internal gear and rotating said output stub and attached bevel pinion of said output shaft, said rotating bevel pinion meshing with and rotating said first leg bevel gear and attached elevating screw shaft, said output shaft simultaneously rotating said operatively connected second leg input shaft and attached bevel pinion, said rotating second leg bevel pinion meshing with and rotating said second leg bevel gear for rotating said attached elevating screw shaft, so that the ratio of turns of said first leg input shaft to inches of vertical travel of said legs is from about 20 to about 40; and further wherein when said gear means is shifted to high gear, said pinion gear engages said complementary-shaped spline slot formed in said input carrier for rotating said input carrier and attached output stub, bevel pinion and output shaft, said rotating first leg bevel pinion meshing with and rotating said first leg bevel gear and attached elevating screw shaft, said output shaft simultaneously rotating said operatively connected second leg input shaft and attached bevel pinion, said rotating second leg bevel pinion meshing with and rotating said second leg bevel gear for rotating said attached elevating screw shaft, so that the ratio of turns of said first leg input shaft to inches of vertical travel of said legs is from about 3 to about 4.5.

7. The assembly of claim 6, wherein a one-piece bent metal gear box encases said first leg input shaft pinion gear, said input carrier, said planet pinions, and said internal gears, and is generally equal in width to said first leg; wherein a crank handle is secured to the outboard end of said first leg input shaft for manual rotation of said shaft; wherein an intermediate portion of said first leg input shaft is formed with a transverse continuous cylindrical opening containing a detent spring and detent balls; wherein a sleeve is mounted on an outboard face of said gear case in alignment with an opening formed in said gear case, said sleeve having outboard and inboard annular recesses formed in an internal surface thereof; wherein said outboard and inboard pairs of recesses are spaced apart about ⅜ of an inch; wherein said detent balls engage said outboard and inboard annular recesses when said assembly is in high gear and low gear, respectively; and wherein the ratio of turns of said first leg input shaft to inches of vertical travel of said legs is from about 25 to about 35 in low gear and from about 4 to about 4.5 in high gear.

8. The assembly of claim 7, wherein a flange plate is mounted on an inboard portion of each of said first and second legs for mounting said landing gear assembly on an outboard surface of the semitrailer frame; and wherein the ratio of turns of said first leg input shaft to inches of vertical travel of said legs is about 34 to 1 in low gear and about 4.5 to 1 in high gear.

9. The assembly of claim 7, wherein a flange plate is mounted on an outboard portion of said gear case and forms the outboard portion of said gear case, and is mounted on an outboard portion of said second leg, for mounting said landing gear assembly on an inboard surface of a semitrailer frame; and wherein the ratio of turns of said first leg input shaft to inches of vertical travel of said legs is about 34 to 1 in low gear and about 4.5 to 1 in high gear.

10. A two speed landing gear assembly for a semitrailer, comprising:
   a) first and second upright telescopic legs mounted in a laterally spaced relationship generally adjacent to a front end of said semitrailer;
   b) in-line laterally-oriented input and output shafts rotatably mounted on said first leg, said output shaft being operatively connected to an input shaft rotatably mounted on said second leg; and
   c) gear means mounted on and generally adjacent to each of said shafts for operating said landing gear in a high gear and a low gear, said input shaft on said first leg being axially movable to allow for shifting between said gears, said gear means achieving a double gear reduction between the input and output shafts when in low gear and providing for direct coupling of the input and output shafts when in high gear, so that upon shifting said gear means of said first leg input and output shafts into low gear, a ratio of turns of said first leg input shaft to inches of vertical travel of said legs of from about 15 to about 50 is achieved, and upon shifting said first leg gear means into high gear by engaging a pinion gear of said first leg input shaft in a spline slot of said output shaft, said ratio of from about 2 to about 5 is achieved.

11. The assembly of claim 10, in which said gear means is i) said pinion gear mounted on an inboard end of said first leg input shaft, ii) an intermediate gear mounted on a fixed shaft adjacent to said first leg input shaft, said intermediate gear including an outboard portion having a first set of gear teeth formed thereon and a reduced diameter integral inboard portion having a second set of gear teeth formed thereon, iii) a dual-function gear mounted on an outboard end of said output shaft, said dual-function gear having teeth formed along the circumference thereof and said spline slot formed in an outboard central portion thereof which is complementary in size and shape to said pinion gear, iv) a bevel pinion mounted on said output shaft inboard from said dual-function gear, v) a bevel gear mounted on an upper end of an upright elevating screw shaft mounted within said first leg, vi) a bevel pinion mounted on said second leg input shaft, and vii) a bevel gear mounted on an upper end of an upright elevating screw shaft mounted within said second leg; wherein when said landing gear assembly is operated in low gear, said first leg input shaft and attached pinion gear are rotated and said pinion gear meshes with said first set of gear teeth of said intermediate gear for rotating said intermediate gear, said second set of rotating gear teeth meshing with said gear teeth of said dual-function gear for rotating said dual-function gear and attached output shaft and bevel pinion, said rotating bevel pinion meshing with and rotating said bevel gear for rotating said attached elevating screw shaft, said operatively connected second leg input shaft and attached bevel pinion being simultaneously rotated by said rotating output shaft, said rotating second leg input shaft bevel pinion meshing with and rotating said second leg bevel gear for rotating said attached second leg elevating screw shaft, so that the ratio of turns of said first leg input shaft to inches of vertical travel of said legs is from about 20 to about 40; and further wherein when said gear means is shifted to high gear, said pinion gear engages said complementary-shaped spline slot formed in said dual-function gear for rotating said dual-function gear and attached output shaft and bevel pinion, said rotating bevel pinion meshing with and rotating said bevel gear and attached elevating screw shaft, said output shaft simultaneously rotating said operatively connected second leg input shaft and attached bevel pinion, said rotating second leg input shaft bevel pinion meshing with and rotating said second leg bevel gear for rotating said attached elevating screw shaft, so that the ratio of turns of said first leg input shaft to inches of vertical travel of said legs is from about 3 to about 4.5.

12. The assembly of claim 11, wherein a one-piece bent metal gear box encases said first leg input shaft pinion gear, said intermediate gear, and said dual-function gear and is generally equal in width to said first leg; wherein a crank handle is secured to the outboard end of said first leg input shaft for manual rotation of said shaft; wherein an intermediate portion of said first leg input shaft is formed with a transverse continuous cylindrical opening containing a detent spring and detent balls; wherein a sleeve is mounted on an outboard face of said gear case in alignment with an opening formed in said gear case, said sleeve having outboard and inboard annular recesses formed in an internal surface thereof; wherein said outboard and inboard recesses are spaced apart about ⅜ of an inch; wherein said detent balls engage said outboard and inboard annular recesses when said assembly is in low gear and high gear, respectively; and wherein the ratio of turns of said first leg input shaft to inches of vertical travel of said legs is from about 25 to about 35 in low gear and from about 4 to about 4.5 in high gear.

13. The assembly of claim 12, wherein a flange plate is mounted on an inboard portion of each of said first and second legs for mounting said landing gear assembly on an outboard surface of the semitrailer frame; and wherein the ratio of turns of said first leg input shaft to inches of vertical travel of said legs is about 34 to 1 in low gear and about 4.5 to 1 in high gear.

14. The assembly of claim 12, wherein a flange plate is mounted on an outboard portion of said gear case and forms the outboard portion of said gear case, and is mounted on an outboard portion of said second leg, for mounting said landing gear assembly on an inboard surface of a semitrailer frame; and wherein the ratio of turns of said first leg input shaft to inches of vertical travel of said legs is about 34 to 1 in low gear and about 4.5 to 1 in high gear.

15. The assembly of claim 10, in which said gear means is i) said spline mounted on an inboard end of said first leg input shaft, ii) a bevel pinion mounted on an outboard end of said output shaft, said bevel pinion having an output stub attached to an outboard face thereof, iii) an input carrier formed with said spline slot which is complementary in size and shape to said pinion gear, said input carrier being mounted in a spaced relationship outboard from said output stub by a plurality of dowel pins which extend between and are attached to said output stub and input carrier, iv) a planet pinion mounted on each of said dowel pins between said output stub and said input carrier, with each of said planet pinions having an outboard portion having a first set of gear teeth formed thereon and an integral reduced diameter inboard portion having a second set of gear teeth formed thereon, v) an internal gear generally formed along the circumference of an opening formed in an outboard wall of said first leg, vi) a bevel gear mounted on an upper end of an upright elevating screw shaft mounted within said first leg, vii) a bevel pinion mounted on said second leg input shaft and, viii) a bevel gear mounted on an upper end of an upright elevating screw shaft mounted within said second leg; wherein when said landing gear assembly is operated in low gear, said first leg input shaft and said pinion gear are rotated and said pinion gear meshes with said first set of gear teeth of said planet pinions for rotating said pinions and attached reduced diameter second set of gear teeth; said rotating second set of gear teeth of said planet pinions meshing with said internal gear and rotating said output stub and attached bevel pinion of said output shaft, said rotating bevel pinion meshing with and rotating said first leg bevel gear and attached elevating screw shaft, said output shaft simultaneously rotating said operatively connected second leg input shaft and attached bevel pinion, said rotating second leg bevel pinion meshing with and rotating said second leg bevel gear for rotating said attached elevating screw shaft, so that the ratio of turns of said first leg input shaft to inches of vertical travel of said legs is from about 20 to about 40; and further wherein when said gear means is shifted to high gear, said pinion gear engages said complementary-shaped spline slot formed in said input carrier for rotating said input carrier and attached output stub, bevel pinion and output shaft, said rotating first leg bevel pinion meshing with and rotating said first leg bevel gear and attached elevating screw shaft, said output shaft simultaneously rotating said operatively connected second leg input shaft and attached bevel pinion, said rotating second leg bevel pinion meshing with and rotating said second leg bevel gear for rotating said attached elevating screw shaft, so that the ratio of turns of said first leg input shaft to inches of vertical travel of said legs is from about 3 to about 4.5.

16. The assembly of claim 15, wherein a one-piece bent metal gear box encases said first leg input shaft pinion gear, said input carrier, said planet pinions, and said internal gears, and is generally equal in width to said first leg; wherein a crank handle is secured to the outboard end of said first leg input shaft for manual rotation of said shaft; wherein an intermediate portion of said first leg input shaft is formed with a transverse continuous cylindrical opening containing a detent spring and detent balls; wherein a sleeve is mounted on an outboard face of said gear case in alignment with an opening formed in said gear case, said sleeve having outboard and inboard annular recesses formed in an internal surface thereof; wherein said outboard and inboard pairs of recesses are spaced apart about ⅜ of an inch; wherein said detent balls engage said outboard and inboard annular recesses when said assembly is in high gear and low gear, respectively; and wherein the ratio of turns of said first leg input shaft to inches of vertical travel of said legs is from about 25 to about 35 in low gear and from about 4 to about 4.5 in high gear.

17. The assembly of claim 16, wherein a flange plate is mounted on an inboard portion of each of said first and second legs for mounting said landing gear assembly on an outboard surface of the semitrailer frame; and wherein the ratio of turns of said first leg input shaft to inches of vertical travel of said legs is about 34 to 1 in low gear and about 4.5 to 1 in high gear.

18. The assembly of claim 16, wherein a flange plate is mounted on an outboard portion of each of said gear case and forms the outboard portion of said gear case, and is mounted on an outboard portion of said second leg, for mounting said landing gear assembly on an inboard surface of a semitrailer frame; and wherein the ratio of turns of said first leg input shaft to inches of vertical travel of said legs is about 34 to 1 in low gear and about 4.5 to 1 in high gear.

19. A plural speed trailer support assembly, comprising:
a) leg means for supporting said trailer, said leg means comprising an upper leg section, a lower leg section and an elevating mechanism for extending said lower leg section relative to said upper leg section;
b) axially in-line input and output shafts for driving said elevating mechanism, said input shaft being axially movable for changing speeds;
c) gear means for achieving a double gear reduction between said input and output shafts when said input shaft is axially moved to a certain position, for operating said support assembly at low speed; and
clutch means for directly coupling said input and output shafts when said input shaft is axially moved to a certain other position, for operating said support assembly at high speed.

20. The plural speed trailer support assembly of claim 19, in which said clutch means is a spline of said input shaft and a spline slot of said output shaft.

* * * * *